United States Patent [19]

Frederiksen

[11] Patent Number: 4,682,360
[45] Date of Patent: Jul. 21, 1987

[54] VIDEO TRANSMISSION SYSTEM

[76] Inventor: Jeffrey E. Frederiksen, 603 W. Haven Dr., Arlington Heights, Ill. 60005

[21] Appl. No.: 564,405

[22] Filed: Dec. 22, 1983

[51] Int. Cl.$^4$ .............................................. H04N 7/167
[52] U.S. Cl. ........................................ 380/10; 380/14; 380/15; 380/19; 380/20
[58] Field of Search ............... 358/120, 121, 122, 123, 358/124

[56] References Cited

U.S. PATENT DOCUMENTS

| | | | |
|---|---|---|---|
| 4,222,068 | 9/1980 | Thompson | 358/120 |
| 4,245,246 | 1/1981 | Cheung | 358/121 |
| 4,266,243 | 5/1981 | Shutterly | 358/121 |
| 4,318,125 | 3/1982 | Shutterly | 358/121 |
| 4,389,671 | 6/1983 | Posner et al. | 358/124 |
| 4,390,898 | 6/1983 | Bond et al. | 358/119 |
| 4,424,532 | 1/1984 | Toonder et al. | 358/120 |
| 4,484,027 | 11/1984 | Lee et al. | 178/22.13 |
| 4,511,919 | 4/1985 | Forgey et al. | 358/120 |

Primary Examiner—Stephen C. Buczinski
Attorney, Agent, or Firm—Stephen G. Rudisill

[57] ABSTRACT

A subscriber cable television system uses predominantly digital signal processing techniques and has extremely high security and an increased capacity for transmitting program and customer data to individual decoder units. For ease of data handling, two-channel audio, video, and high capacity program and customer data are multiplexed for transmission on the composite video signal. The decoder unit employs a system timing circuit which precisely synchronizes the sample times on the received composite video signal to the chrome burst, regardless of whether the video information is for a color or black-and-white program. An improved time-warp and segment scrambling method is disclosed along with means for suppressing the undesirable effects of discontinuities in the scrambled video signal. The digital audio is transmitted as scrambled most significant bits in low resolution samples and unscrambled least significant bits in a high resolution remainder sample. The system timing circuit has a horizontal sync detector accommodating variable line length such as is provided by some video recording apparatus. The clock to the horizontal counter is selectively phase-reversed in response to early or late horizontal sync so that the timing resolution is twice the clock period. An improved self-adjusting threshold detector and other means are disclosed for detecting a "20 IEEE" suppressed horizontal sync so that the full range of video modulation may be used more effectively. Circuitry is also disclosed for transmitting the customer and program information in a multi-level correlative signalling format in order to more effectively use the band width of the entire television channel.

3 Claims, 32 Drawing Figures

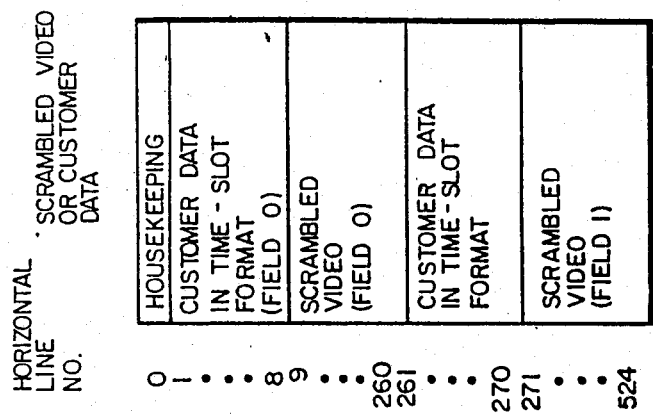
FIG. 4
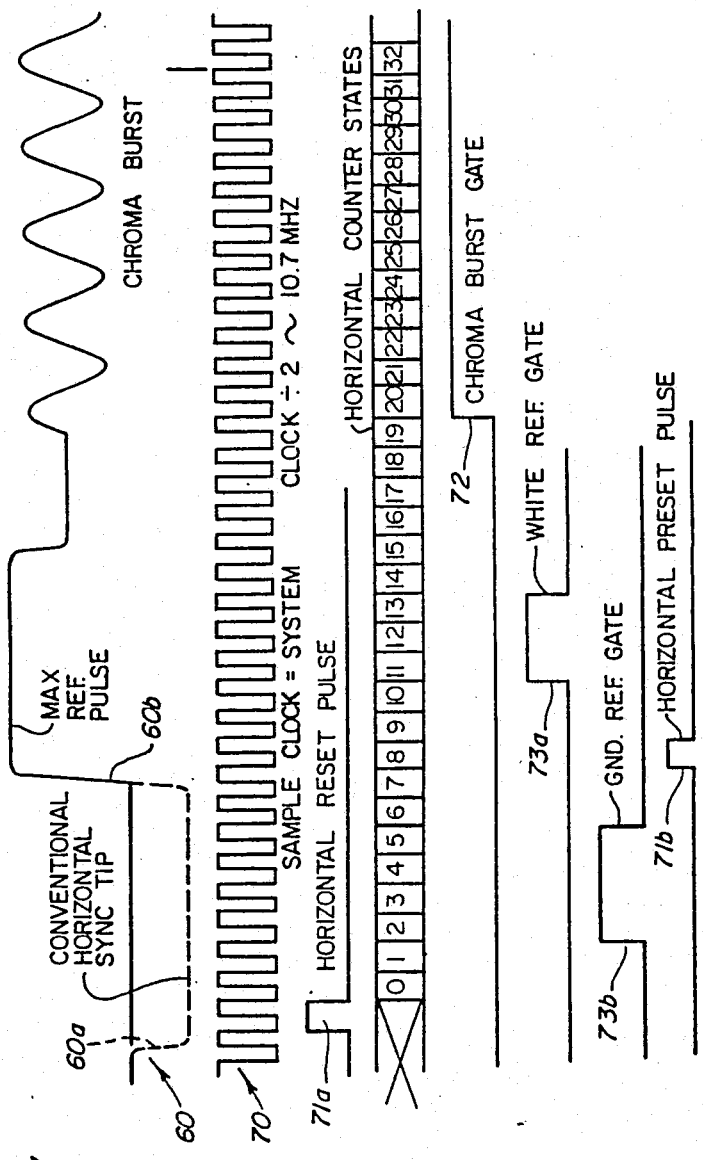
FIG. 5
FIG. 3

| SYSTEM ID | PROGRAM INFO | SEED | MISCELLANEOUS |
FIG. 6
| RECORD NO. | CUSTOMER DATA IN TIME-SLOT FORMAT | PARITY |
FIG. 7
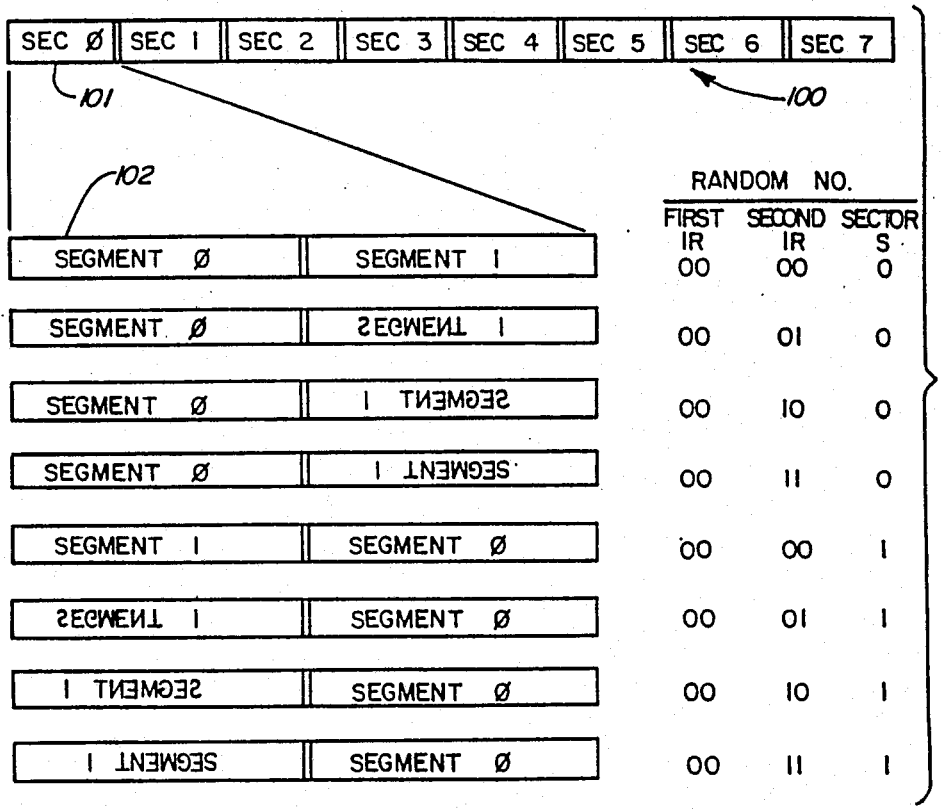
FIG. 9
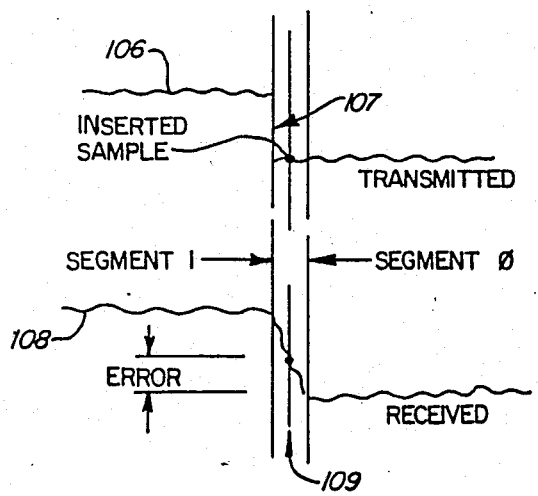
FIG. 11

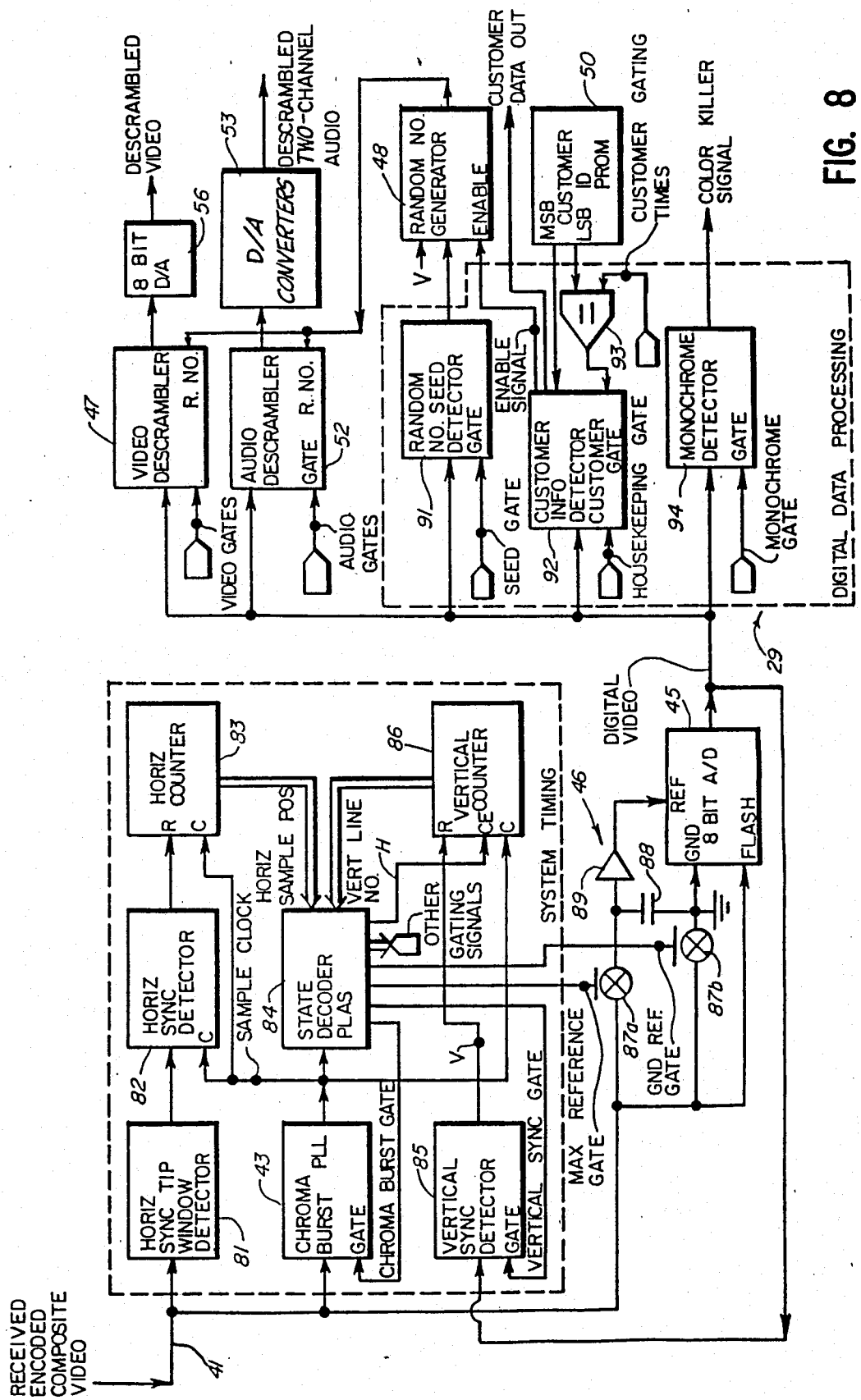

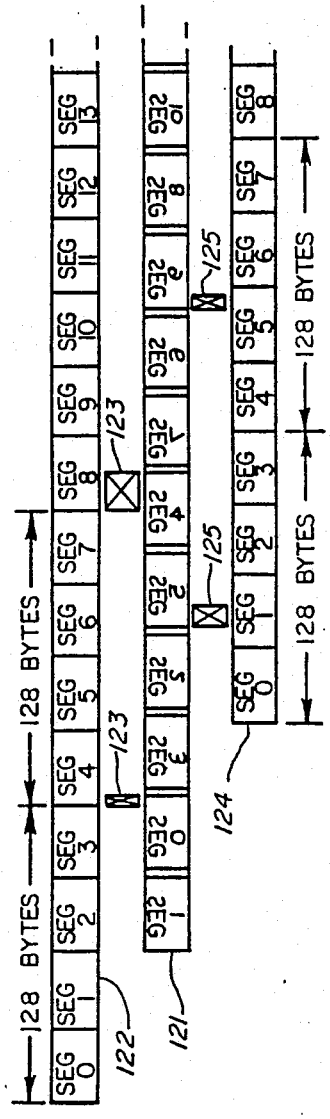
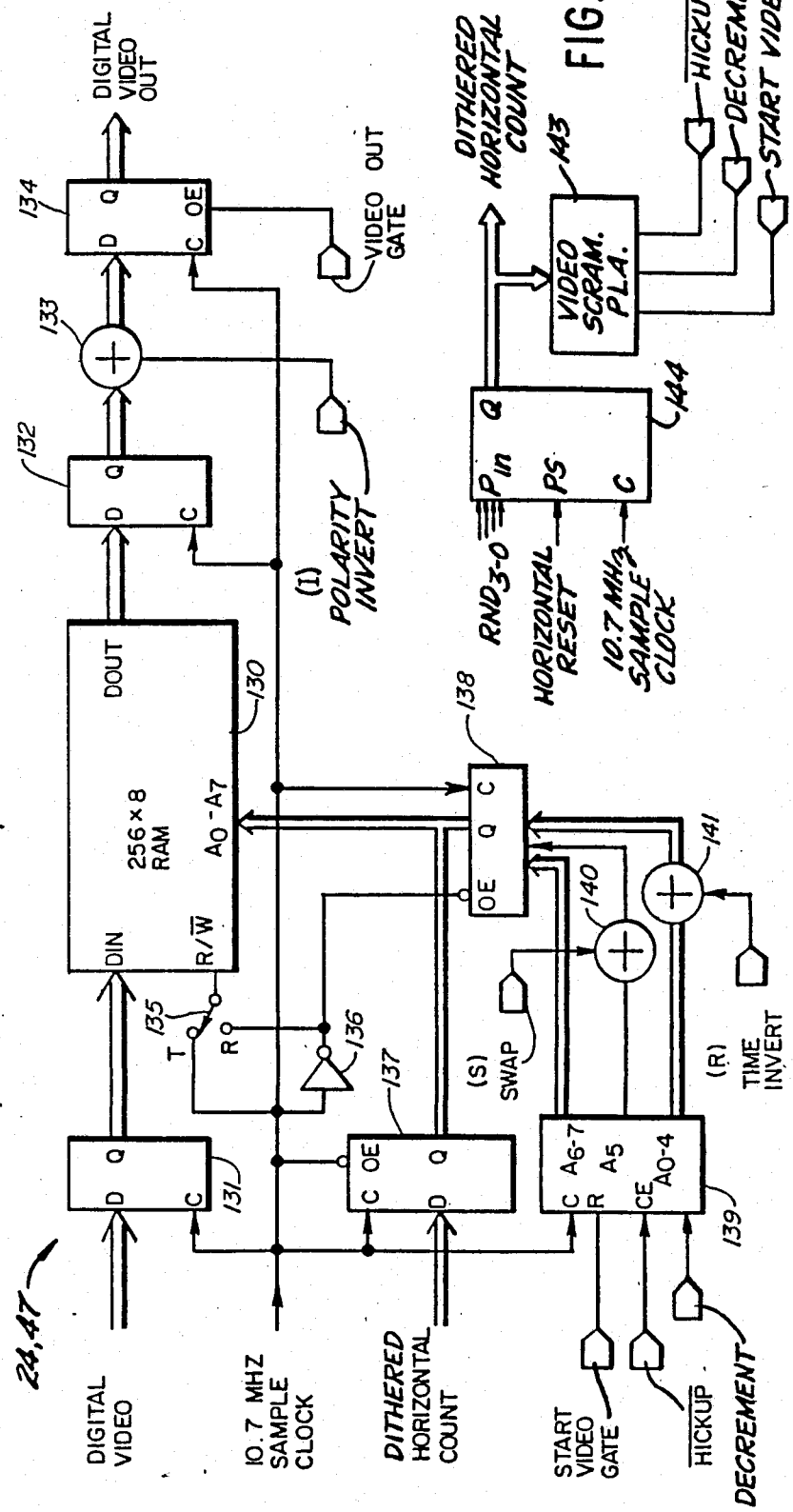
FIG. 12
FIG. 13

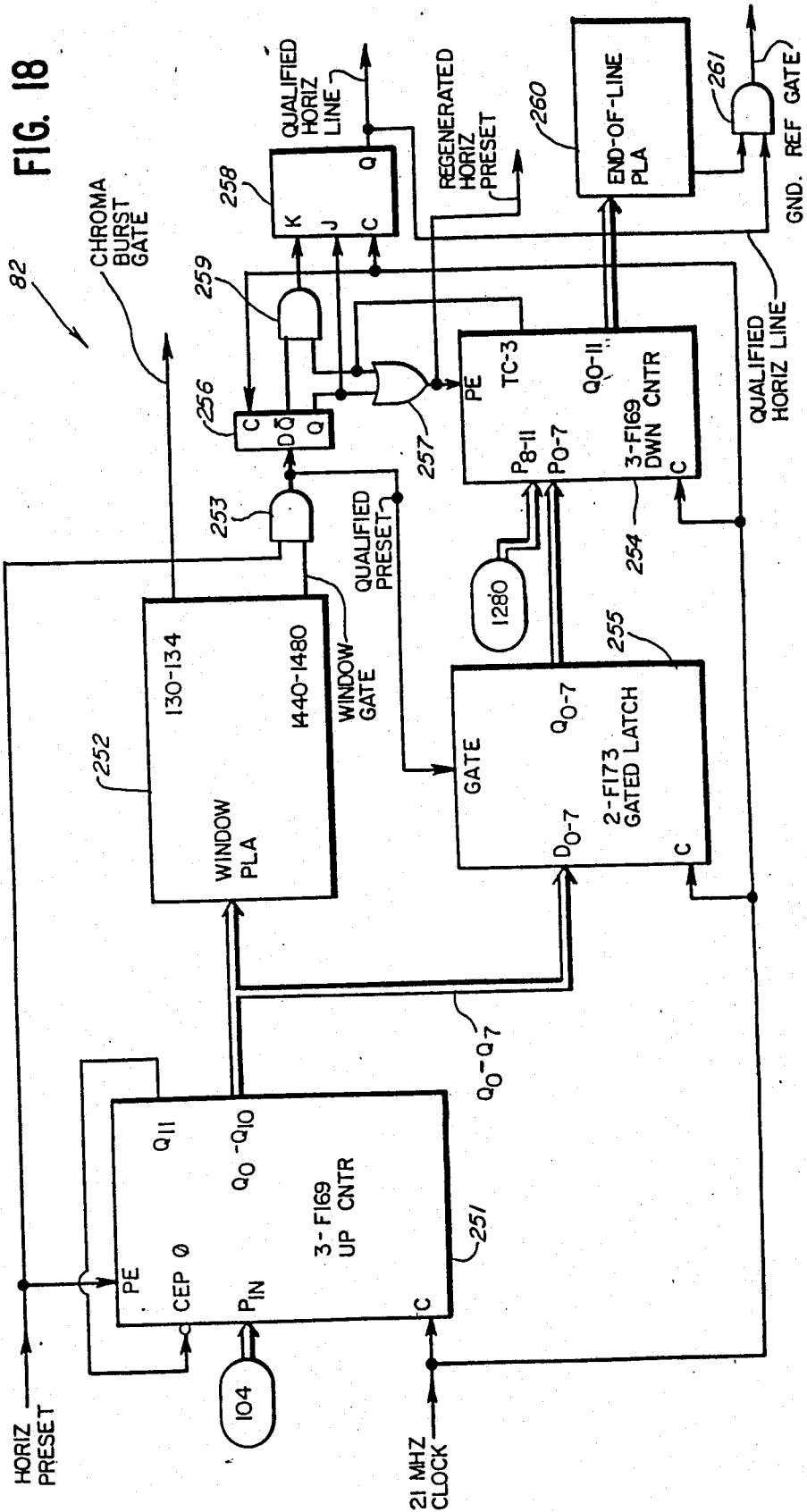

VIDEO TRANSMISSION SYSTEM

BACKGROUND OF THE INVENTION

This invention relates generally to secure communication systems and, more particularly, to cable television systems wherein designated subscribers are enabled to receive particular program material.

In any such subscriber television system, means are required for scrambling the audio and video information, and means are also required for transmitting program and subscriber information to designate subscribers permitted to view particular programs. Although the prior art discloses a wide variety of methods, commercially accepted systems typically perform these functions by independent analog scrambling of the audio and video information, and by multiplexing digital customer and program data with either the audio or video signals. Popular techniques include, for example, "sine-wave scrambling" of the video to suppress horizontal synchronization and modulating the audio information on a supersonic subcarrier. More advanced commercial systems employ a pseudo random code for scrambling the video information, for example, by polarity inversion of the video signal on a frame-by-frame or line-by-line basis. These techniques have required increased complexity and cost, but the additional security is needed to frustrate pirates who have gained considerable skill and experience in circumventing security measures.

SUMMARY OF THE INVENTION

A principal object of the invention is to provide a subscriber cable television system having an inexpensive decoder yet also having extremely high security and an increased capacity for transmitting program and customer data to the decoder units.

Another object is to provide a video transmission system wherein two-channel audio, scrambled video, and high capacity program and customer data are all multiplexed onto a composite video signal.

An additional object is to provide an improved method of transmitting digitally-scrambled audio.

Still another object is to provide an improved system timing circuit in the decoder unit for defining precisely synchronized sample times on the received composite video signal.

Yet another object to provide a horizontal sync detector circuit capable of accommodating variable horizontal rates, such as are generated by some video recording apparatus.

And another object is to provide a method of synchronizing a counter to a reset pulse to obtain a timing resolution exceeding the clocking period of the counter.

Moreover, it is an object to provide means for using the full range of video modulation for tranmsitting the video portion of the composite video signal.

BRIEF DESCRIPTION OF THE DRAWINGS

Other objects and advantages of the invention will become apparent upon reading the following detailed description and upon reference to the drawings, in which:

FIG. 3 is a pictorial diagram of one horizontal line of the video signal encoded by the encoder of FIG. 1;

FIG. 4 is a pictorial diagram showing the contents of the scrambled video or customer data portion of the horizontal lines by line number in the television frame;

FIG. 5 is a pictorial diagram of the horizontal synchronization and chroma burst portion of the beginning of each encoded horizontal line;

FIG. 6 is a pictorial diagram showing the arrangement of the housekeeping data packed into the first horizontal line of the television frame FIG. 7 is a pictorial diagram showing the record number and parity check number in each line of customer data in time-slot format;

FIG. 8 is a block diagram of the decoder or receiver of FIG. 2, showing in detail the system timing portion which is common to both the encoder and decoder of the video transmission system;

FIG. 9 is a pictorial diagram showing the method of scrambling or encoding the video portion of the horizontal lines to prevent unauthorized reception;

FIG. 11 is a pictorial diagram showing the undesirable effects of discontinuities introduced by the encoding scheme and one method for reducing the distortion from the decoded video signal;

FIG. 12 is a pictorial diagram showing the memory contention problem occurring when the total number of video samples in a video line is increased and decreased during video encoding and decoding;

FIG. 13 is a schematic diagram of a video scrambler/-descrambler having a 256 byte memory in order to avoid the memory contention problem;

FIG. 18 is a schematic circuit diagram of a horizontal sync detector accommodating varying line length and tolerating missing horizontal sync pulses;

FIG. 19 is a timing diagram depicting the window gate signal which qualifies horizontal sync pulses;

Figure 1:
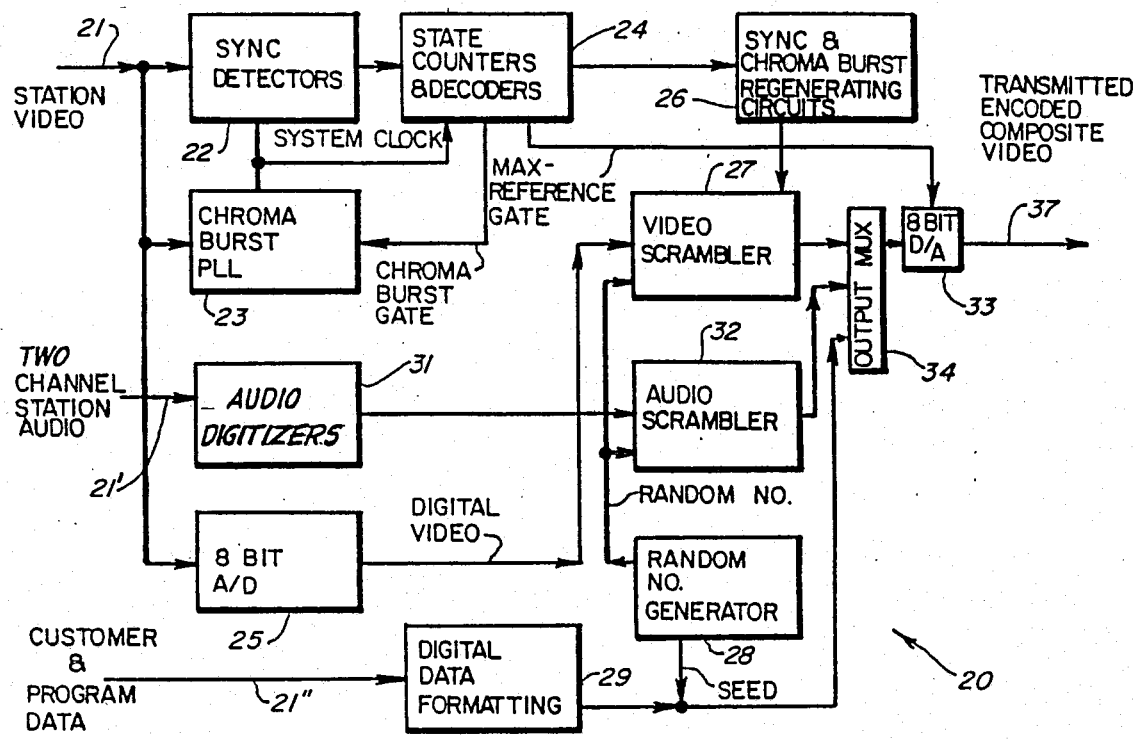
FIG. 1 is a block diagram of the encoder or scrambler portion of the video transmission system according to the invention.

While the invention is susceptible to various modifications and alternative constructions, a certain preferred embodiment has been shown in the drawings and will be described below in detail. It should be understood, however, that there is no intention to limit the invention to the specific form described but, on the contrary, the intention is to cover all modifications, alternative constructions and equivalents falling with the scope of the appended claims.

DESCRIPTION OF THE PREFERRED EMBODIMENT

Turning now to the drawings, there is shown in FIG. 1 a block diagram of a scrambler or encoder generally designated 20 for one embodiment of the video transmission system of the present invention. The scrambler 20 receives station video on an input 21, two-channel station audio signals on an input 21', and customer and program data on a digital input 21". The scrambler 20 is most generally described as a synchronous logic circuit, with a predetermined set of operations occurring periodically at predefined times with respect to the vertical and horizontal synchronization signals present in the station video on the input 21. In order to synchronize the scrambling functions with the horizontal and vertical synchronization signals, sync detectors 22 isolate the horizontal and vertical synchronization signals from the station video, and a chroma burst phase-locked loop 23 generates a system clock precisely phase-locked to the chroma burst signal in the station video so that the operations of the scrambler 20 may be even more precisely defined as a function of time with respect to the horizontal and vertical synchronization signals. The precise beginning of a horizontal line, for example, is indicated by the first transition in the system clock following a horizontal sync edge, thereby rejecting noise or jitter in the position of the horizontal sync edge. The detected horizontal and vertical sync signals are used to reset horizontal and vertical state counters 24 having decoders for generating gating signals which enable the scrambling or encoding operations to be performed at precise predetermined times with respect to the horizontal and vertical synchronization signals. A chroma burst gate, for example, is fed back to the chroma burst phase-locked loop 23 to specify the time at which the chroma burst signal is present in the station video on the input 21.

The scrambling of the video signal is performed on a time-sampled basis, and the video samples are processed in digital form. The station video on the input 21 is sampled at three times the frequency of the chroma burst by an eight bit analog-to-digital converter 25. Since the chroma burst frequency represents the frequency of the suppressed carrier for phase modulation of the chroma signals, a sampling rate of three times the chroma burst frequency is about the lowest sampling rate that may be used. For the standard 3.58-MHz chroma burst frequency, the sampling of the eight bit analog-to-digital converter 25 occurs at a 10.7 MHz rate in synchronism with the system clock from the chroma burst phase-locked loop 23. Because of this high sampling frequency, the analog-to-digital converter 25 is a parallel mode or "flash" converter. The digital video output of the analog-to-digital converter 25 is quantized to 256 levels specified by the eight bits from the analog-to-digital converter; in practice it is found that the eight bits are sufficient for generating a digital video signal which may be processed and converted back to analog form without significant visual perception of the quantization error. Since the sampling rate is a multiple of the chroma burst frequency, the quantization error components coincide with the existing components in the television signal, and the intermodulation products "zero beat" to become unobtrusive.

Due to the delay associated with video scrambling, sync and chroma burst regenerating circuits 26 are used to generate, in digital form, a delayed version of these signals. This delayed version is precisely synchronized to the system clock, and is in effect pre-programmed in a memory addressed during the beginning of each encoded video line.

A video scrambler 27 receives the digital data encoding the beginning of each horizontal line from the sync and chroma regenerating circuits 26. Then the digital video is encoded in the video scrambler 27 by randomly scrambling the time positions of the digital video samples in response to a predetermined random number. The random number is specified by a free-running random number generator 28 containing predetermined and secret key logic. A seed number generated by the random number generator 28 is periodically transmitted from the encoder 20 to the decoder (40 in FIG. 2) to maintain synchronization so that a copy of the random number may be generated by a similar random number generator in the decoder. Because the key logic is secret, the random number cannot be generated merely from the seed which could possibly be intercepted as it is transmitted from the encoder to the decoder.

The seed numbers, as well as digital data for transmitting program identification and customer data, are time multiplexed with the scrambled video information and transmitted from the encoder to the decoder. The digital data, for example, are received from the customer and program data input 21" and loaded into storage registers in the digital data formatting circuits 29. These buffered or stored data are then transmitted at predetermined times in response to gating signals from the state decoders 24.

The two audio channels are also digitized, scrambled, and time multiplexed with the scrambled video and the customer and program data. Each channel of the two-channel station audio 21' is fed to a separate one of two audio digitizers 31, each generating binary audio data at a rate of 36 bits per horizontal video line, or 565,200 bits per second. The binary audio data for each audio channel for each horizontal line are scrambled by an audio scrambler 32 in response to the random number provided by the random number generator 28.

In accordance with one feature of the present invention, the digital audio and the customer and program data are formatted into two-bit binary numbers which are converted to analog samples and then time multiplexed with the scrambled video for transmission. The 72 binary bits of audio for each horizontal line are formatted into 12 two-bit binary numbers and six eight-bit binary numbers containing lesser significant digital audio bits. The binary numbers are routed by an output multiplexer to an eight-bit digital-to-analog converter 33 so that the analog samples are placed before the video portion of each horizontal line in the encoded composite video. Similarly, the digitized customer and program data are also transmitted as analog samples.

Due to the limited band width of the transmission channel, the scrambled digital video cannot be transmitted through the channel in digital form. Therefore, the eight-bit digital-to-analog converter 33 is required to generate an analog video signal from the time scrambled digital video samples.

In accordance with another feature of the present invention, a chroma burst signal is always transmitted regardless of whether the station video is for a color or black and white program. The chroma burst signal is used at the decoder for generating a system clock synchronized to the system clock in the encoder. Thus, the sample times for the audio samples and the customer and program data may be determined at the decoder from the system clock phase-locked to the received chroma burst.

Figure 2:
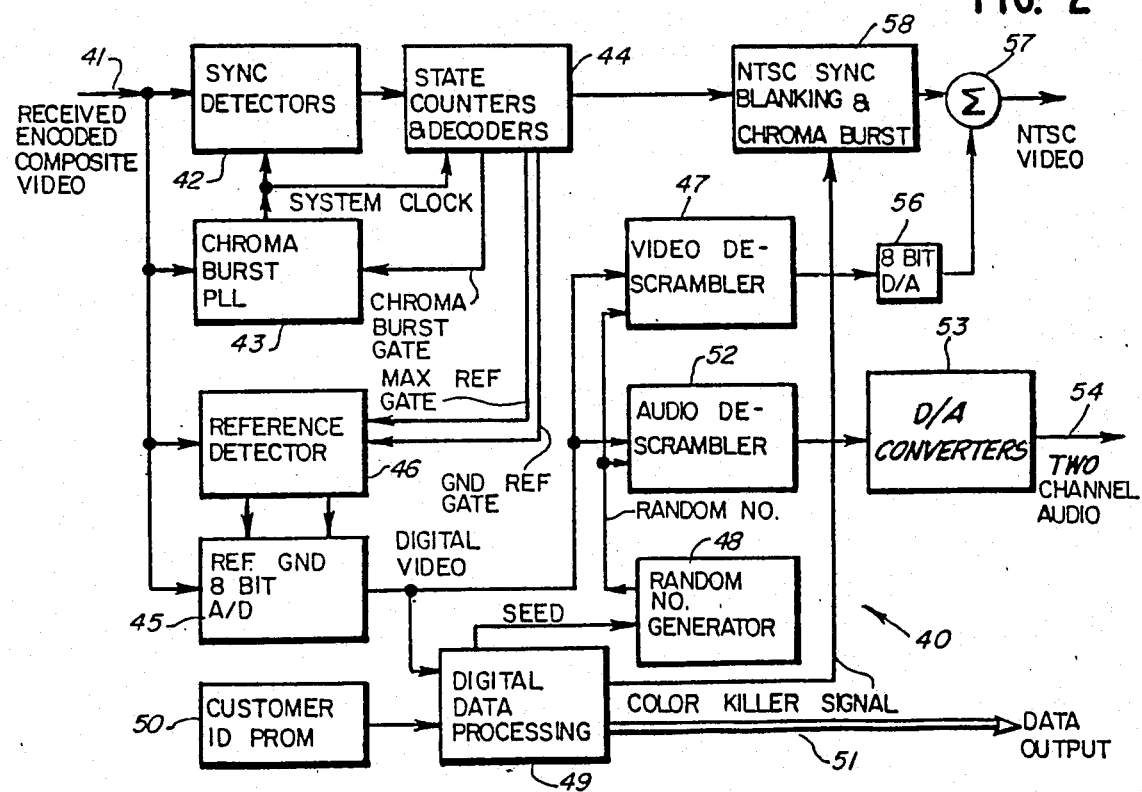
FIG. 2 is a block diagram of the decoder or descrambler portion of the video transmission system.

A block diagram of the descrambler or decoder 40 is shown in FIG. 2. The encoded composite video is received on an input 41, and sync detectors 42 strip off the horizontal and vertical synchronization information. The chroma burst phase-locked loop 43 regenerates a system clock and the system clock is fed to state counters 44 being reset by the horizontal and vertical synchronization signals. As in the encoder 20, the state counters have decoders for generating gating signals such as a chroma burst gate which enables the chroma burst phase-locked loop 43 to sense the received encoded composite video. The received encoded composite video is also fed to an eight-bit analog-to-digital flash converter 45 for generating a digital video signal.

In accordance with another feature of the present invention, the reference for the eight-bit analog-to-digital converter 45 in the decoder 40 is not supplied by a peak detector, but rather the reference is provided by a reference detector 46 gated by reference gates from the state counters and decoders 44. The eight-bit digital-to-analog converter 36 in the encoder 20, for example, outputs a maximum or "max" reference signal in response to a max reference gate from the state counters and decoders 24 so that a precise full scale signal is transmitted from the encoder 20 to the decoder 40. The state counters and decoders 44 in the decoder similarly generate a max reference gate fed to a max reference detector 46 which samples and holds the received max reference signal, for use as a reference to the eight-bit analog-to-digital converter 45. The state counters and decoders 44 also generate a ground reference gate for setting the horizontal sync tips precisely at signal ground so that the range of the eight-bit analog-to-digital converter 45 is fully determined.

The digital video is fed to a video descrambler 47 and digital data processing circuits 49. The digital data processing circuits strip the seed number from the digital video and pass it to a random number generator 48. The seed number synchronizes the random number generator 48 in the decoder 40 to the random number generator 28 in the encoder 20. The random number regenerated in the decoder 40 is passed to the video descrambler 47.

A customer identification PROM 50 is programmed with a unique customer number for each decoder. The customer identification number specifies a time slot in the digital video signal when specific customer information is being transmitted and received. Some of this information is available on an output bus 51 so that the video transmission system may provide digital data transmission to support future products such as teletext and electronic mail.

An audio descrambler 52 also receives the digital video signal and the random number from the random number generator 48. The two-channel audio signals are regenerated by two separate digital-to-analog converters 53 and are fed via output lines 54 to the customer's stero hi-fi. Two channels rather than just one are desired to provide for transmission of stereo or bi-lingual programming. The descrambled video, on the other hand, is converted to analog form by an eight-bit digital-to-analog converter 56, and a combiner 57 mixes the descrambled video with signals from an NTSC sync, blanking, and chroma burst generating circuit 58 so that an NTSC composite video signal results. The NTSC video is fed to the customer's television set. It should also be noted that the NTSC sync, blanking, and chroma burst circuits 58 receive a color killer signal from the digital data processing circuits 49 in order that the chroma burst is removed from the NTSC video signal when a black-and-white program is being received. Conventional television sets have color killer circuits to turn off the chroma amplifiers when a black-and-white signal is being received, and these color killer circuits are responsive to the presence or absence of the chroma burst signal. Thus, the video transmission system according to the present invention transmits a digital signal from the encoder to the decoder so that the NTSC video signal fed to the customer's television set may have the chroma burst deleted to improve the reception of black-and-white programs.

A pictorial diagram of the transmitted encoded composite video signal, generally designated 60, is shown in FIG. 3. The signal is drawn so that "white" is at the top or maximum of the video signal 60 and "black" is at the bottom of the video signal. The conventional horizontal sync tip (shown in dashed representation), in fact, is more negative than the video signal for the darkest picture element. Thus, the horizontal sync tip is typically stripped from the rest of the video signal by a threshold detector set at approximately the "black" level. In the applicant's preferred embodiment, however, the conventional horizontal sync tip is suppressed as shown, and the circuits shown in FIGS. 22–25 and described below are used to in effect regenerate the suppressed horizontal sync. Following the suppressed horizontal sync tip is the reference pulse at the maximum of the video signal. Following the max reference pulse is the chroma burst of approximately 3.58 MHz. The chroma burst is 100% peak-to-peak about a 50% video level in order to reduce phase-lock noise susceptibility. Following the chroma burst are two digital samples containing vertical synchronization information. Each digital sample is comprised of two sample clock cycles since the first sample clock cycle is used for slewing from one digital sample to the next. The digital samples have a maximum value, for example, to indicate that the next horizontal line is the first line in the video frame, and have a minimum value otherwise. Following these digital samples are 18 digital samples of digital audio comprising a total of 36 sample clock cycles. The horizontal line is completed by 590 sample clock cycles of scrambled video or customer data.

A pictorial diagram of the information content for one frame 65 of the encoded composite video signal is shown in FIG. 4. The horizontal line numbered 0, immediately following a vertical sync pulse, contains digital housekeeping data. Horizontal lines 1-8 contain customer data in a time-slot format. The data for a particular customer, for example, are located at a particular position in a particular one of the horizontal lines 1-8. Lines 9-260 contain the scrambled video for the even field of the frame 65. Horizontal lines 261-270 continue with customer data in time slot format. Finally, lines 271-524 contain the odd field of the scrambled video in the frame 65. It should be noted that the vertical sync and digital audio have been placed in the horizontal blanking time of the 63.5 microsecond horizontal line. Similarly, housekeeping and customer data in time slot format have been inserted in the conventional vertical sync and blanking time of the video frame. These sync portions and conventionally unused blanking portions of the video signal can be packed with data since synchronization for both color and black-and-white programs is based on the use of the chroma burst, and the blanking signals are regenerated by the decoder using the NTSC sync, blanking, and chroma burst generating circuits 58 (FIG. 2).

The acquisition of horizontal sync is illustrated by the timing diagram in FIG. 5. Each of the chroma burst phaselocked loops 23, 43 comprises a crystal oscillator having a fundamental frequency of six times the chroma burst frequency, or approximately 21.4 MHz. This 21.4 MHz frequency is used as a system clock to define the times for operation of the various logic functions in the encoder or decoder. The system clock frequency is divided by two in order to generate a 10.7 MHz sample clock 70 for digitally processing the video signal. The sample clock 70 is the primary phase reference for all decoding operations.

The first falling transition of the sample clock after the leading edge 60a of the horizontal sync tip, for example, defines the beginning of a horizontal reset pulse 71a having a width of one sample clock. The horizontal reset pulse is used as a synchronous reset input to a horizontal counter clocked by the sample clock to define a horizontal position or count along each horizontal line. In other words, the time zero reference for each line is a predetermined phase point on the decoder phase reference immediately after the horizontal sync edge. A chroma burst gate 72, for example, enables the chroma burst phase-locked loops 23, 43 during horizontal counter states 20-46. A max reference gate 73a is enabled for horizontal counter states 11-13 in order to sample the top of the max reference pulse, and a ground reference gate is enabled for horizontal counter states 2-5 to set the horizontal sync tip at signal ground. In a similar fashion, gating signals for the vertical sync, the digital audio, and the scrambled video or customer and program data are generated from the horizontal counter states. Thus the time positions of the analog samples in the composite video encoding the audio information and customer and programming data are synchronized to the decoder phase reference at predetermined time intervals from the time zero reference.

In practice, for example, a programmable logic array (PLA) has outputs that are programmed to be active upon various horizontal counter states. A gating signal which is logically high or low for a number of cycles is conveniently generated by a JK flip-flop with its J input being active upon the horizontal counter state preceding each low-to-high transition of the gating signal, and its K input active upon the horizontal counter state preceding each high-to-low transition of the gating signal. It should also be noted that in general the horizontal and vertical counters are preset to initial states different than zero. In "state 0" of FIG. 5, for example, the horizontal counter should have a large initial value so that the counter "rolls over" to zero when the scrambled video portion of the horizontal line is reached. Then the output of the horizontal counter can be used to directly address video memory in the video descrambler 47 (FIG. 8). It is also desirable to preset the horizontal counter more than once per horizontal line. The trailing edge 60b of the horizontal sync tip, for example, is a more precise and stable time zero reference for the horizontal line since the trailing edge is a transition from the most negative to the most positive portion of the composite video signal. Thus it is desirable to generate a horizontal preset pulse 71b synchronized to the sample clock immediately after the trailing edge 60b. The horizontal preset pulse 71b then presets the horizontal counter to state 9.

A pictorial diagram of the customer and program data in the housekeeping line 74 is shown in FIG. 6. The line contains, for example, a system identifier, program information, the random number generator seed, and miscellaneous or reserved data slots. The system identifier is, for example, a 24-bit number unique to the system, allowing over 16 million distinct systems. Reception of the assigned system identifier may be used to enable the decoder so that units stolen from one system cannot be used secretly in another system. In other words, the system identifier is a "global prefix" to the customer I.D. numbers.

The program information identifies the video information or programming being viewed. A "parental guidance" rating is the most significant part of the program information. It is desirable to have a number of rating levels, for example sixteen specified by a four-bit number. To enhance parental control over the TV reception, a threshold level could be transmitted from the control station to the individual decoders to specify the highest rating of programs to be decoded.

Another important part of the housekeeping data is the seed for the random number generator 48. To maintain synchronization of the random number generator 48 (FIG. 2), the seed is loaded into the random number generator for each video frame.

Preferably a few locations on the housekeeping line are reserved for miscellaneous functions. For enhanced security, these miscellaneous functions could include changing the key logic or the format for the loading of the random number seed. Another desirable miscellaneous function is to change the customer data from a time-slot format to a stream format wherein the customer data in time slot format is used to enable a group of customers and then the customer data is transmitted in stream format to all of the enabled customers. The stream format mode could be used, for example, for transmitting electronic mail to the selected group of customers.

Shown in FIG. 7 is a line 75 of customer data in time-slot format. It should be noted that all of the customers cannot be individually accessed by transmitting customer data in time-slot format during just a single line of customer data. Thus, the group of customers selected for receiving customer data in time-slot format must be identified by a record number preferably appended to the beginning of a corresponding line 75 of customer data. A 16-bit record number, for example, specifies one of 65,536 different groups of customers having time slots corresponding to the same record number. A maximum cycle time of about two seconds is required for individually addressing over one-half million subscribers. The record number associated with a particular customer is, for example, the prefix or most significant bits of the customer I.D. number in the customer I.D. PROM 50 (FIG. 2). Certain record numbers could be reserved for addressing groups of customers. A record number of 0, for example, could indicate that every customer is to receive the customer data in time-slot format for the current line 75 of customer data. In this case, when the record number is 0, the customer information detector 92 does not require a match of the record number with the most significant bit portion of the customer I.D. number in the customer I.D. PROM 50. Then the customers would be grouped according to their common time-slot position in the frame. This method of grouping would permit any selected group to be accessed within less than half the framing period, or within less than approximately 17 milliseconds. The customers are accessed on an individual basis, for example, to completely disable the decoders for customers who have not paid their bills, or to enable the accessing of special programming material for individual customers. The parental guidance threshold level for each customer, for example, is periodically transmitted as customer data in the corresponding time-slot positions. Customers could be addressed in a group format, for example, according to geographic location for the transmission of local news.

An important feature of the customer data line 75 is a parity check number at the end of the line. Since a parity check is used, the match of the beginning of the video portion of any line having the particular record number can start the detection of customer data at the time slot position, since the parity check may be used to exclude or ignore customer data received when the record number is falsely generated by the scrambled video. Thus customer data may be transmitted at high speed by temporarily interrupting the transmission of scrambled video and transmitting customer data in time-slot format in every video line, including vertical sync and blanking. The decoding of customer data is also simplified since the operation of the decoding process is independent of the line number of the line 75 of customer data.

A more detailed block diagram of the descrambler or decoder is shown in FIG. 8. A horizontal sync tip window detector 81 strips the horizontal sync tips from the received encoded composite video on the input 41, and thereby isolates the leading and trailing sync edges 60a, 60b. A horizontal sync detector 82 generates the horizontal preset pulse 71b in synchronism with the 10.7 MHz sample clock immediately following the trailing sync edge 60b. An additional feature to be described completely below is that the horizontal sync detector 82 will generate a preset pulse even if a horizontal sync tip is not received. The horizontal sync detector 82 will estimate when the horizontal preset pulse should occur based on the previous horizontal line. The preset pulse from the horizontal sync detector 82 presets a horizontal counter 83 clocked by the sample clock to generate a horizontal sample position or count. The state decoder PLAs 84 generate a chroma burst gate, a vertical sync gate, a max reference gate, and a ground reference gate as a function of the horizontal sample position, as well as other gating signals. The vertical sync gate is fed to a vertical sync detector 85 to generate a vertical reset pulse V fed to a vertical counter 86. The vertical counter is a synchronous counter clocked by the sample clock but enabled only once for each horizontal line by a horizontal pulse H generated by the state decoder PLAs 84. The horizontal line number generated by the vertical counter 86 is also fed to the state decoder PLAs to generate gating signals which enable the processing of data formatted according to horizontal line number, as shown in FIG. 4.

The max reference gate is fed to the max reference detector 46 shown as including a sample and hold circuit having an analog transmission gate 87a, a holding capacitor 88, and a buffer 89. The buffer 89 feeds the reference of the eight-bit analog-to-digital converter 45. The ground reference, on the other hand, is obtained by a peak detecting or sampling circuit. The ground reference is subtracted from the received composite video to restore the DC level of the video signal. A preferred circuit is described below in conjunction with FIG. 29. Alternatively, a transmission gate 87b sets the ground reference.

The two most significant bits of the digital video output of the analog-to-digital converter 45 are fed back to the vertical sync detector 85. All eight bits are fed to the video scrambler 47 and the audio descrambler 52. Only the two most significant bits are fed to the random number seed detector 91, and a customer information detector 92. The customer information detector 92 is responsive to the housekeeping gates and is enabled at the particular customer data time-slot corresponding to the customer identification number stored in the customer ID PROM 50. A digital comparator 93 generates the customer gate signal when the least significant bits in the customer ID PROM 50 equal the customer gating time specified by the horizontal counter 83 and the vertical counter 86. The customer ID PROM 50, in other words, includes the particular horizontal count or counts corresponding to the assigned time slot in the customer data time-slot positions shown in FIG. 4, as well as the particular record number assigned to the customer.

The customer information detector 92 includes the gated latches which receive the customer and program data. Separate latches, for example, store the record number received from the beginning of the video portion of every line, the 4-bit parental guidance threshold for the particular customer, and the 4-bit parental guidance rating for the particular program. The latch for the parental guidance threshold is enabled by the coincidence of the customer gate from the digital comparator 93, specifying the customer's time-slot position in the frame, and the matching of the output of the record number latch and the most significant portion (MSB) of the customer identifier stored in the customer ID PROM 50. The customer information detector 92 generates an enable signal fed to the random number generator 48 to permit program reception. The enable signal is active unless the numerical value of the output of the parental guidance rating latch exceeds the output of the parental guidance threshold latch, as determined by a 4-bit digital magnitude comparator. Note that the parental guidance threshold and rating may be used to effectively turn off non-paying customers, for example, by transmitting a threshold of zero to non-paying customers and assigning the rating of zero just to commercials and channel identification or emergency messages. The highest rating of fifteen, of course, is reserved for the most sensitive and restricted adult program material.

Also shown in FIG. 8 is a monochrome detector 94 receiving the two most significant bits of the digital video for generating the color killer signal. It should be noted that the detector circuits in general are synchronous latches enabled at the respective gating times. A typical IC part number is 74173. The corresponding logic in the encoder of FIG. 1 is even more simple since the vertical pulse, monochrome signal, and other data are merely multiplexed onto the output of the digital data formatting circuit 29 at the corresponding gating times.

Since it is especially important that a vertical sync or a monochrome signal detect is not falsely registered, the two most significant digital video bits must be simultaneously high for two sample periods before these detect signals are registered and used by the encoder to reset the vertical counter 86 or to disable the reception of color. In other words, the signal detects indicate, to a high probability, that the respective vertical synchronization or monochrome information is present in the composite video signal, but the absence of a signal detect does not necessarily indicate that the respective information was absent.

The time-warp and segment scrambling or encoding method performed by the video scrambler 27 is illustrated in FIG. 9. The video portion 100 of a horizontal line is subdivided into eight sectors of approximately 64 video samples per sector. Each sector 101 is in turn subdivided into two segments 102 of approximately 32 video samples per segment.

The segments in each sector are scrambled in accordance with three bits (I, R, S) generated by the random number generator 28, 48. The first two bits (I, R) may change only once every 32 video samples or once for each segment, while the third bit (S) may change once every 64 video samples, or once for each sector. The first bit (I) designates whether the polarity of the corresponding segment is inverted. The second bit (R) designates whether the time sequence of the corresponding segment is reversed or inverted. The third bit (S) indicates whether the two segments in the corresponding sector are swapped. The eight combinations obtained when the first two bits are zero for the first corresponding segment (SEGMENT O) are shown in FIG. 9. Note that when the random numbers are all zero, the encoded sector is the same as the original unencoded sector. It is also evident from FIG. 9 that there are thirty-two different possible scrambled combinations for each sector, corresponding to the combination of the five different scrambling bits (First I&R, Second I&R, Sector S) indicated in FIG. 9. Note that in the method as shown in FIG. 9, the samples in a given sector are scrambled only with other samples in the sector.

Figure 10:
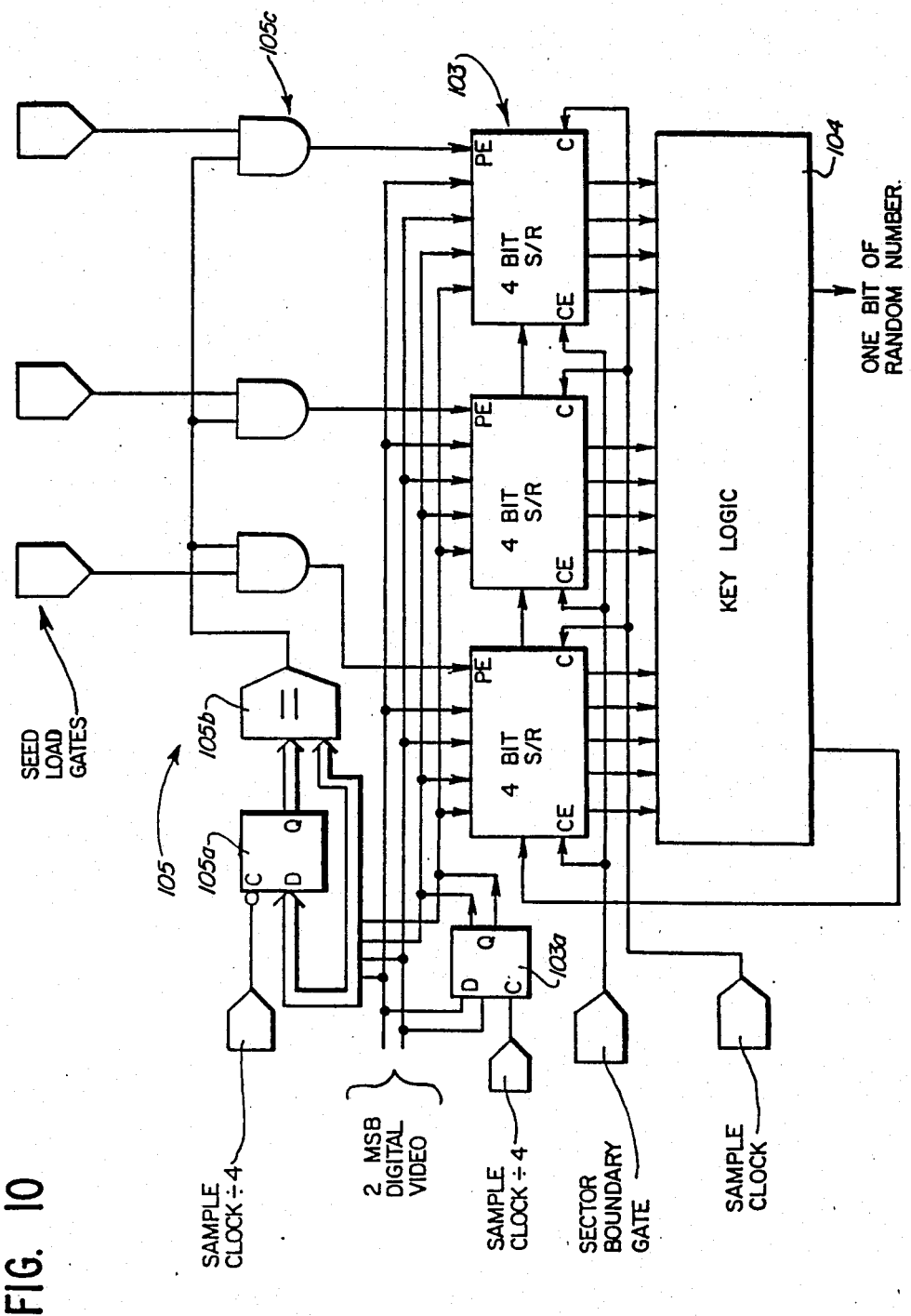
FIG. 10 is a simplified block diagram of a one bit portion of the random number generator used in the encoder and the decoder for preventing unauthorized persons from determining the encoding key merely by detailed analysis of the encoded signal.

The random number for the scrambling method of FIG. 9 is easily generated by a random number generator of the type shown in FIG. 10. A set of four-bit shift registers 103 is loaded with the four-bit portions of the seed number as the housekeeping line is received. The two bits from each digital sample, obtained from the two most significant bits of the digital video, are multiplexed to four bits by a two bit latch 103a clocked at the sample clock frequency divided by four or approximately 2.7 MHz. A random number bit is generated by key logic 104 from the outputs of the four-bit shift registers. The key logic 104 also generates an input to the shift registers 104 which is serially shifted through the shift registers by one bit position at the boundary of each sector. The key logic 104 preferably is a combinatorial logic network or PLA. A PLA having a reasonable number of gates generates a "pseudo" random number providing sufficient security.

As was the case with detection of vertical sync and the monochrome bit, it is important that the seed number should be latched into the shift register 103 only when it is certain that the seed number has been received correctly. Otherwise the random number will be incorrect until the next frame when the seed is again loaded. To substantially eliminate the falsing problem, each four-bit nibble of the seed is transmitted in duplicate and each nibble is loaded into the shift register 103 only when the duplicates match. An error detecting circuit 105 has a four-bit register 105a for temporary storage and a digital comparator 105b for determining whether the previously received four bits match the current four bits fed to the shift register 103. AND gates 105c permit the shift registers 103 to be loaded only when the magnitude comparator 105b indicates a match.

According to another feature of the present invention, the undesirable effects of discontinuities at the segment boundaries in the scrambled video signal are suppressed during encoding by inserting between the segments, an additional "consecutive" sample at the beginning and end of each segment in the scrambled signal, the samples being consecutive in the order of the samples in each segment in the scrambled signal. Before decoding, the inserted samples are deleted from the received encoded video.

Consider first the simplified method shown in FIG. 11. The transmitted encoded composite video 106 will have a discontinuity generally designated 107 at the boundaries between pairs of segments that are no longer in their original time sequence after scrambling. Thus the received signal 108 will slew at the discontinuity 107 due to the limited band width of the channel. At a sampling rate of 10.7 MHz and a band width of 4.2 MHz, the adjacent samples are not independent. Thus, the slew will generate an error in the sample 109 immediately following the discontinuity 107. One method to reduce this error is to insert a sample at the beginning of each segment, the sample being set equal to the first transmitted sample in each segment. Then, at the receiver, the inserted sample is disregarded because it is erroneous due to the slewing. It has been found, however, that this method is not entirely successful due to the fact that the slope or time rate of change of the received and band-limited scrambled signal is not preserved at the end of the first segment and the beginning of the second segment in each segment pair.

Figure 11A:
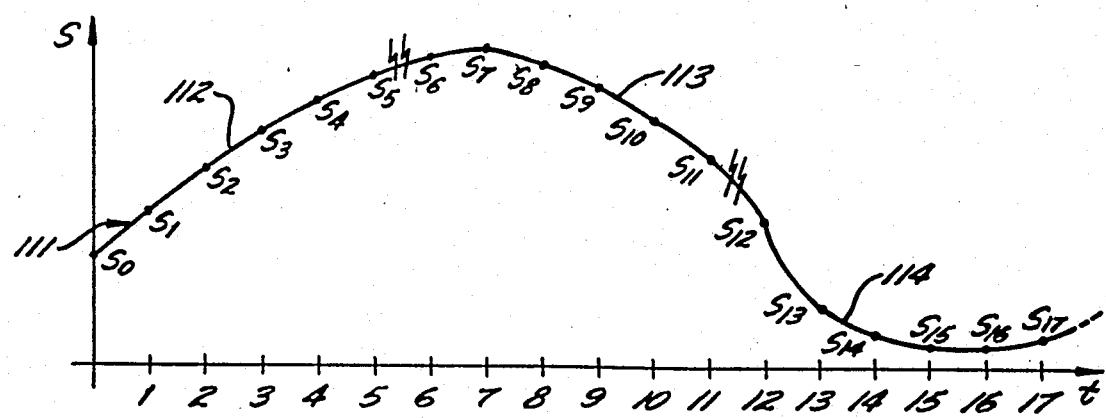
FIGS. 11A, 11B, and 11C are pictorial diagrams showing the preferred method for virtually eliminating the distortion caused by the discontinuities introduced during scrambling.
Figure 11B:
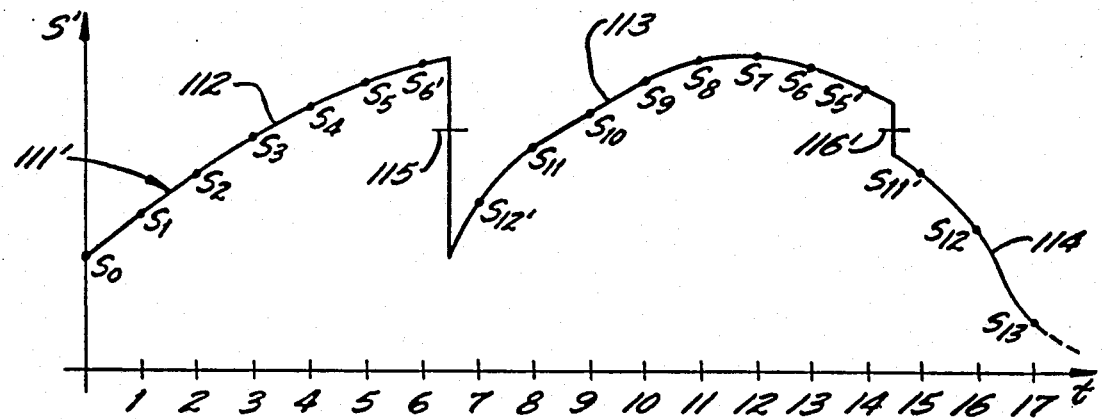
Figure 11C:
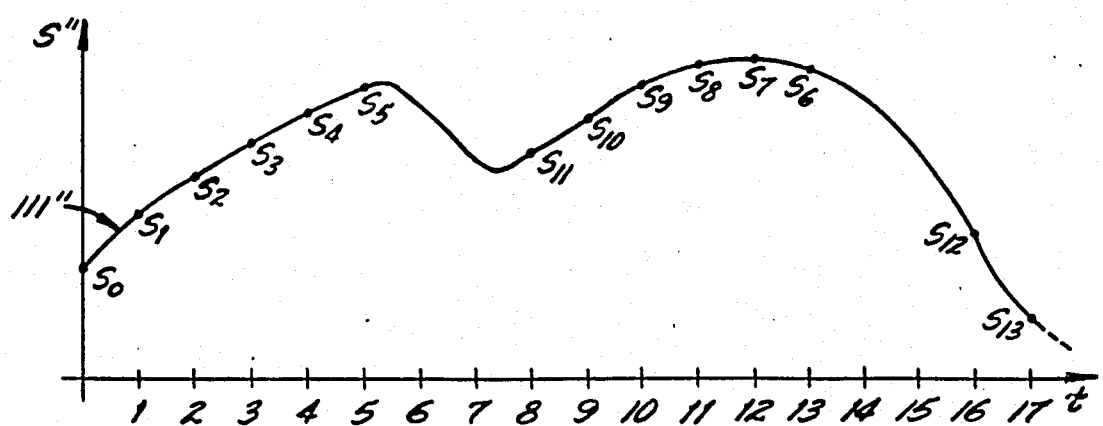

The error generated by slewing at the discontinuities is virtually eliminated by a preferred method shown in FIGS. 11A–11C. The preferred method inserts an additional "consecutive" sample at the beginning and end of each segment in the scrambled signal, the respective samples being consecutive in the order of the samples in each corresponding segment in the scrambled signal, to thereby preserve the time rate of change of the received and band-limited scrambled signal at the end and beginning of each segment in the band-limited scrambled signal. Referring now to FIG. 11A, an unscrambled video signal generally designated 111 is repetitively sampled, for example by the eight-bit analog-to-digital converter 25 in FIG. 1, generating an ordered sequence of original samples $S_0$–$S_{17}$. Suppose, for the sake of argument, that the video signal 111 is subdivided into three segments 112, 113, 114, each segment containing six samples, for the purpose of scrambling by time inversion of the second segment 113. In general, the signal is generated by scrambling the segments of original samples so that the sequence of original samples in the scrambled signal is not consecutive between adjacent segments at segment boundaries. According to the preferred method of the present invention, the effect of any discontinuity at segment boundaries is reduced by inserting in the scrambled video signal 111 in FIG. 11B two additional samples for each segment boundary, one of these samples being added to each adjacent end of the adjacent segments at the segment boundaries. The inserted samples are $S_6'$, $S_{12}'$, $S_5'$, and $S_{11}'$, having values equal to the respective values of the original samples $S_6$, $S_{12}$, $S_5$, and $S_{11}$ that are consecutive with the oredered sequence of original samples in the respective segments to which the additional samples are added. In other words, the inserted samples are consecutive in the order, either forward or reverse, of the respective segments to which they are added in the scrambled signal 111'. Thus at the end of the first segment 112 there is inserted the additional sample $S_6'$ to be consecutive with the forward order of samples $S_0$–$S_5$ in the first segment 112. Additional sample $S_{12}'$ is inserted at the beginning and additional sample $S_5'$ is inserted at the end of segment 113 to be consecutive with the reverse order of samples $S_{11}$–$S_6$. Additional sample $S_{11}'$ is inserted at the beginning of the third segment 114 so as to be consecutive with samples $S_{12}$–$S_{17}$.

Due to the effect of the inserted samples $S_6'$, $S_{12}'$, $S_5'$ and $S_{11}'$, the band-limited scrambled signal 111'' in FIG. 11C has its time rate of change preserved at the beginning and end of each segment; in other words, at samples $S_5$, $S_{11}$, $S_6$, and $S_{12}$. Hence all of the original samples in the unscrambled video signal 111 are faithfully reproduced in the band-limited scrambled signal 111''. The inserted samples $S_6'$, $S_{12}'$, $S_5'$, and $S_{11}'$, however, are not reproduced in the band-limited scrambled signal 111''. They are, in effect, sacrificed to preserve the time rate of change at the beginning and end of each segment.

An additional improvement is obtained by inserting a third sample at each segment boundary. The third sample is inserted between the inserted samples added to the ends of the adjacent segments and preferably has a value set equal to the average of the inserted samples added to the ends of the adjacent segments. The average is calculated, for example, by a binary adder fed by latches gated to receive the values of the inserted samples added to the ends of the adjacent segments. A right displacement of the adder outputs provides the required division of two. In FIG. 11B, the third samples are designated 115 and 116; a time scale expansion to accommodate the third samples is presumed. The third samples 115, 116 tend to compensate for any excessive deviation of the inserted samples $S_6'$, $S_{12}'$, $S_5'$, and $S_{11}'$ away from the adjoining segments. The third sample 115, for example, tends to cancel the downward curvature of the scrambled signal 111' at the inserted sample $S_{12}'$. The third sample 116 tends to smoothly join the inserted sample $S_{11}'$ and the inserted sample $S_5'$. In practice, the insertion of third samples is required only if the transmission channel is poor, for example, if ringing is excessive.

The technique of inserting samples during encoding and deleting the samples during decoding adds complexity due to the change in the length of the video portion of the horizontal line. If the line length were constant, the segment swapping and time inversion could be performed with two 64-byte memories. Then the sectors would only need to be alternately loaded into one or the other of the memories, and read out of the same memory with the memory addresses exclusive-OR'ed by the two random number bits (R, S). But the change in video line length requires the reading or writing of the video samples to be controlled in accordance with the particular sector involved, as is illustrated in FIG. 12 for the worst case situation of segment swap and time inversion.

As is evident from FIG. 12, coded sequence 121 must be initially displaced from the unencoded sequence 122 by a delay of 64 samples. Thereafter, the displacement increases by two samples for every 32-sample segment. It is also evident that at least 128 bytes of memory are required for the encoding process, since some samples are delayed by at least 128 sample times during encoding. Moreover, it appears that more than 128 bytes of memory are required to prevent a memory contention problem during overlap intervals designated 123. If the stream of unencoded video samples were merely loaded into sequential memory addresses, then segment 4 would, at a later time, occupy the same memory addresses as segment 0, and segment 8 would, at a later time, occupy the same memory addresses as segment 4. But then the overlap intervals 123 would cause errors in the encoding process, since samples would be written over and destroyed before they were read out of the memory. The first five samples of segment 8, for example, would be written over the first five samples of segment 4 before the first five samples of segment 4 are read out of the memory. As is evident from the decoded sequence 124, this memory contention problem also exists during the decoding process due to overlap intervals 125.

Shown in FIG. 13 is a block diagram of a video scrambler/descrambler 27, 47 employing a 256 byte memory 130 in order to avoid the memory contention problem. A latch 131 receives the digital video samples and feeds the samples to the memory 130. After the time delays indicated in FIG. 12, the samples are read from the memory and received by a latch 132. A bank of exclusive-OR gates 133 selectively complements the video samples in order to perform the polarity inversion scrambling function in response to the random number bit (I). The selectively complemented video samples are received by an output latch 134 having tristate outputs which are enabled to perform an output multiplexing function (34 in FIG. 1).

Since the segment swap, time invert, and polarity invert scrambling functions are complementary, the same components make up the video scrambler 27 and descrambler 47. The only difference between the scrambler 27 and descrambler 47 is the position of a memory read-write switch or maskprogrammed junction 135, the position T being selected for scrambling and the position R being selected for descrambling. During scrambling the digital video samples (122 in FIG. 12) are sequentially written into the memory 130, and later read from memory with extra samples inserted (121 in FIG. 12). During descrambling the digital video samples with extra samples inserted (121 in FIG. 12) are written into the memory and later sequentially read from the memory without extra samples (124 in FIG. 12). The change in position of the switch 135 from scrambling to descrambling reflects the fact that read/write function is complementary for scrambling versus descrambling. The read/write input to the memory 130 is either in phase with the 10.7 MHz sample clock or 180° out of phase, as provided by an inverter 136. Thus the cycle time of the memory is on the order of 45 nanoseconds as digital video samples are alternately written into and read from the memory 130.

The sequential addresses for the memory 130 are provided by a latch 137 receiving a "dithered" horizontal count. The latch 137 addresses the memory 130 whenever unencoded video samples (122 in FIG. 12) are written into the memory or when decoded video samples (124 in FIG. 12) are read from the memory. Another latch 138 is provided to supply nonsequential addresses for reading or writing the scrambled video samples (121 in FIG. 12). The latches 137, 138 have tristate outputs that are wired together to provide an address multiplexing function. The outputs of the latches 137, 138 are alternately enabled at the 10.7 MHz frequency of the sample clock.

To generate the nonsequential addresses corresponding to the time positions of the scrambled video samples, an eight-bit counter generates a monotonic address sequence which is scrambled in accordance with the random number bits (S) and (R). A bank of exclusive-OR gates 141 selectively complements the five least significant outputs of the counter 139 in order to perform the time inversion function, in response to the random number bit (I). A single exclusive-OR gate 140 selectively complements the counter output $A_5$ to perform the segment swap function, in response to the random number bit (S).

In order to duplicate the desired samples in successive segments during the encoding process, the eight-bit counter 139 is decremented at the segment boundaries. For this purpose a decrement gate signal from a video scrambler PLA 143 is applied to the decrement or "up/down" input of the counter 139. The counter 139 is initially reset by a start video gate signal from the video scrambler PLA 143. During encoding the memory 130 is read twice using repeated address after the counter 139 is decremented, so that the inserted samples have the same values as the samples that are consecutive with the first and last samples in the 32-bit segments. During decoding the eight-bit counter 139 is inhibited by a hiccup gate from the PLA 143 as the encoded sequence 121 is written into memory so that these pairs of inserted samples are written to the same address locations in the memory 130. The inserted samples, in other words, are deleted by being written over in the memory.

The video scrambler PLA 143 receives the dithered horizontal count which is generated by a video scrambler horizontal counter 144. The video scrambler horizontal counter 144, like the horizontal counter 83 in the system timing circuit (FIG. 8) is preset by the horizontal reset signal and is clocked at the 10.7 MHz sample clock rate. The video scrambler's horizontal counter 144, however, has a random initial state specified by a four-bit random number $RND_{3-0}$ generated by the pseudorandom number generator 48 (FIG. 2). The positions or segment boundaries at which the video line is subdivided into segments are dependent on the initial state of the video scrambler horizontal counter. In other words, the video lines are subdivided at different predetermined positions or horizontal counts in the video lines for different video lines. The random initial state has the effect of randomly distributing discontinuities over the video line so that visual perception of distortion introduced by discontinuities is further suppressed.

Figure 14:
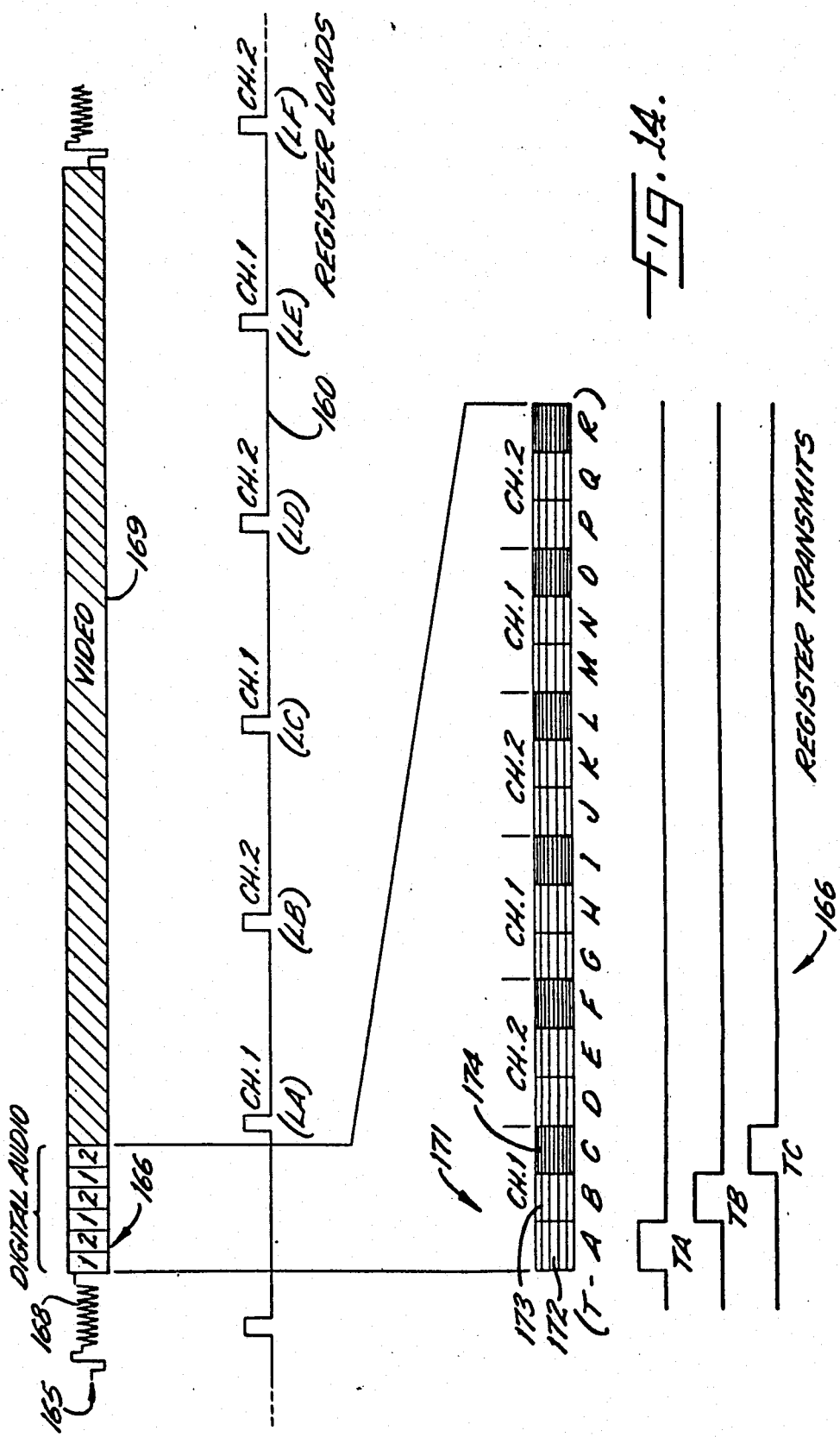
FIG. 14 is a pictorial diagram showing the sampling and encoding of two-channel audio.

The method of encoding the stereo audio onto the composite video signal is shown in FIG. 14. Each of the two audio channels are sampled and digitized three times, and the audio bits for each channel are sequentially accumulated according to the schedule 160, for each 63.5 microsecond interval of the horizontal line 165. The digital audio 166 is inserted in 36 sample clock cycles between the chroma burst and vertical sync 168, and the scrambled video 169. Each sample 171 of the two channel digital audio is encoded as three analog samples 172, 173, 174 per horizontal line, each analog sample having a time duration of two sample clock periods. The first two analog samples 172, 173 per audio sample 171 are quantized to four levels, providing the four most significant bits for the audio sample. These four most significant bits are easily scrambled to scramble the audio sample 171. The third analog sample 174 or remainder is quantized to 256 levels, providing the eight least significant bits of the 12 bits per audio sample 171.

Figure 15:
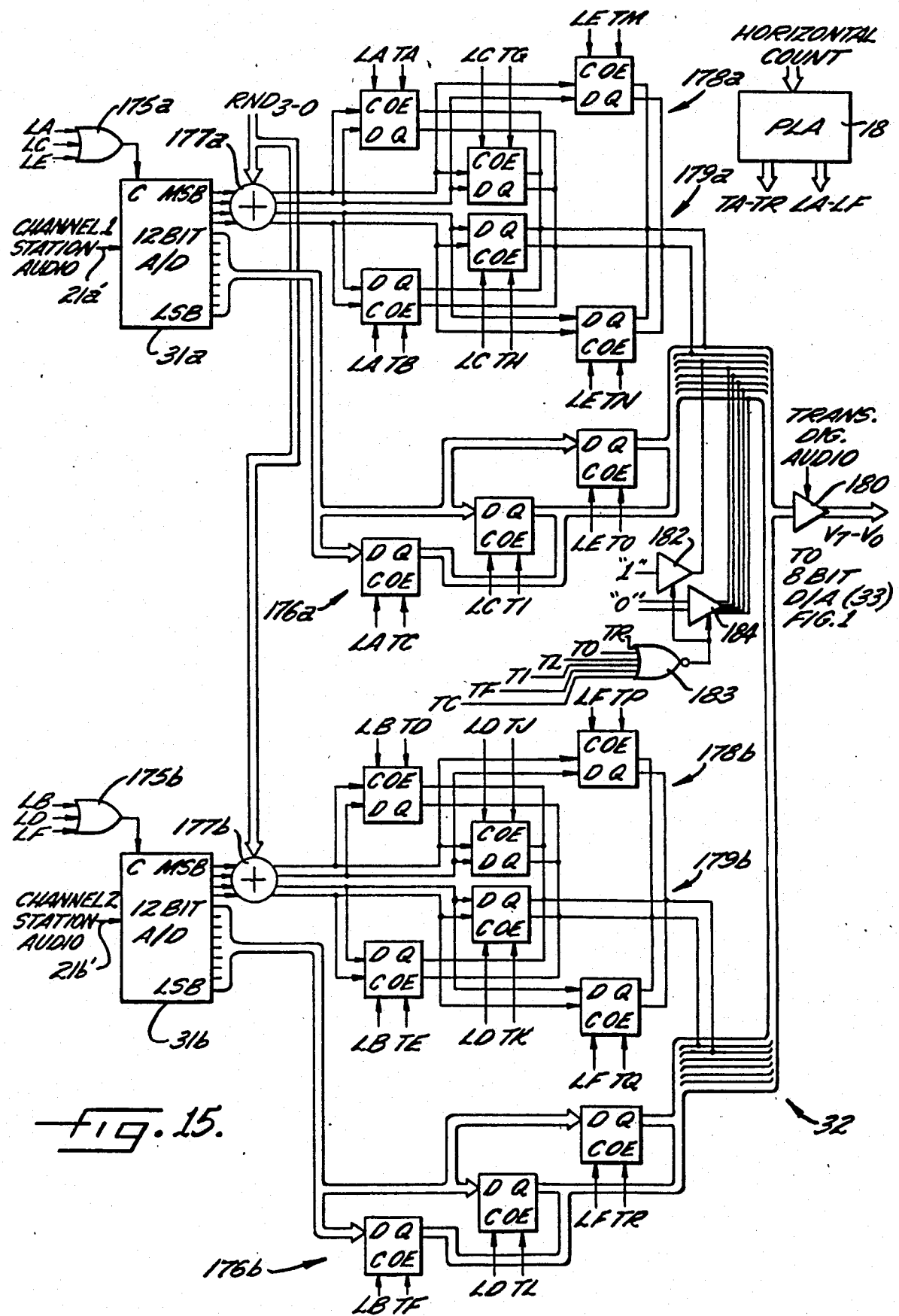
FIG. 15 is a block diagram of the audio scrambling circuits for the video transmission system.

The audio encoder is shown in FIG. 15. The two channel audio inputs 21a', 21b' are fed to respective 12-bit analog-to-digital converters 31a, 31b. The digital-to-analog converters 31a, 31b sample the respective audio inputs 21a', 21b' at the respective load times 160 (FIG. 14) as determined by sequential and periodic load signals LA–LF. Respective OR-gates 175a, 175b clock or strobe the respective analog-to-digital converter 31a, 31b upon the occurrence of load signals LA, LC and LE, or LB, LD and LF, respectively. The least significant eight bits from the analog-to-digital converters 31a, 31b are fed to respective triples of eight-bit latches 176a, 176b. The four most significant bits from the analog-to-digital converters 31a, 31b are received and scrambled by respective sets of four exclusive-OR gates 177a, 177b in response to random number bits $RND_{3-0}$. The two most significant bit outputs of the sets of exclusive-OR gates 177a, 177b are fed to respective triples of 2-bit latches 178a, 178b and the two least significant bit outputs of the sets of the exclusive-OR gates 177a, 177b are also fed to respective triples of two-bit latches 179a, 179b. The latches 176a, 176b, 178a, 178b, 179a, 179b are clocked or strobed at respective load times 160 by the indicated register load signals LA–LF and the latches present output signals to a tri-state driver 180 at register transmit times 166 in response to the indicated register transmit signals TA–TR. The tri-state driver 180 transmits the scrambled digital audio over video bus lines $V_7-V_0$ to the eight-bit digital-to-analog converter 33 in FIG. 1.

It should be noted that the times for the sampling, loading, and register transmitting occur periodically at the horizontal scan frequency. Hence, the required times are obtained from the horizontal count via a programmable logic array 181.

Generally speaking, each channel of the station audio 21a', 21b' is sampled by a respective one of the 12-bit analog-to-digital converters 31a, 31b, the four most significant bits of the 12-bit audio samples are scrambled by the exclusive-OR gates 177a, 177b, and the digital samples are shifted in time from the register load schedule 160 to the register transmit or digital audio schedule 166 by the registers 176a, 176b, 178a, 178b, 179a, and 179b. Each analog sample having a time duration of two sample clock periods, corresponding to the respective register transmit times 166 in FIG. 14, is temporarily stored for reformatting in a respective one of the registers in FIG. 15 being output enabled by the repective register transmit signal TA-TR.

It should be noted that the two-bit latches 178a, 178b hold the first analog sample 173, the two-bit latches 179a, 179b hold the second analog sample 173, and the eight-bit latches 176a, 176b hold the third analog sample 174, for each audio sample 174. It should be noted, however, that the quantized levels in the first two analog samples 172, 173 do not match or align with the quantized levels for the two most significant bits of the eight bits encoded in the third analog sample 174. An offset is intentionally introduced so that it is easy to regenerate at the decoder 40 the two bits corresponding to the four levels of the first two analog samples 172, 173. The regeneration is accomplished by truncation of the six least significant bits at the output of the eight-bit analog-to-digital converter 45 (FIG. 2). The offset is introduced by a tristate driver 182 enabled whenever a first or second analog sample 172, 173 is transmitted as enabled by a NOR gate 183 receiving the transmit signals TC, TF, TI, TL, TO, TR for the eight-bit registers 176a, 176b. Thus the tristate driver 181 is enabled when the first two analog samples 172, 173 are transmitted and is disabled whenever an eight-bit analog sample 174 is transmitted. A second tristate driver 184 sets the lower five video bus lines $V_4$-$V_0$ to logic low when the two-bit analog samples 172, 173 are to be transmitted. It should be evident that the tristate drivers 182, 184 cannot be enabled simultaneously with the outputs of the eight-bit registers 176a, 176b since the outputs are wired together.

Figure 16:
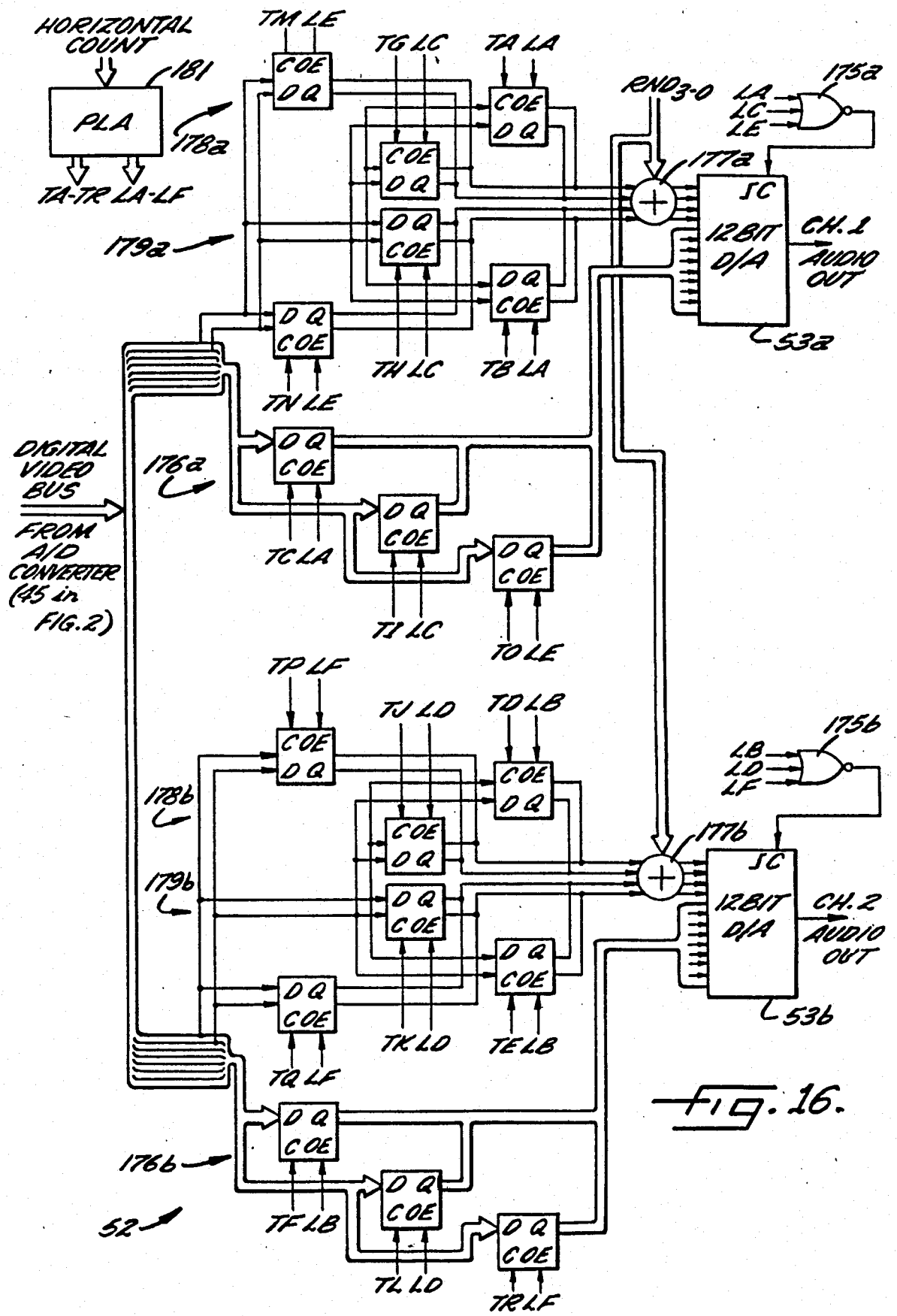
FIG. 16 is a block diagram of the audio descrambling circuits for the video transmission system.

The audio descrambler 52 is shown in FIG. 16. It should be evident that the audio descrambler 52 uses essentially the same components as the audio scrambler 32 (FIG. 15) and the wiring in FIG. 16 is drawn in mirror image relation to the wiring in FIG. 15. The main functional difference is that the registers in the audio descrambler 52 are clocked by the respective register transmit signals TA-TR and are output enabled by the respective load register signals LA-LF. In other words, the wires to the clock input C and output enable input OE for each register are reversed to wire the registers for either an audio scrambler 32 or an audio descrambler 52. The audio descrambler, however, uses twelve-bit digital-to-analog converters 53a, 53b instead of the analog-to-digital converters 31a, 31b.

In general terms, the audio descrambler 52 receives the digital audio 166 from the composite video signal 155 (FIG. 14) in digitized form from the digital video bus leading from the eight-bit analog-to-digital converter 45 in FIG. 2. The registers 176a, 176b, 178a, 178b, and 179a, 179b are sequentially clocked or strobed by the register transmit signals TA-TR (FIG. 14) so that the binary values of the analog samples 172, 173, 174 of the audio samples 171 are latched into the respective registers in response to the respective register transmit signals. For each register load signal LA-LF shown in FIG. 14, a particular set of three registers holding the three analog samples 172, 173, 174 corresponding to a particular one of the six audio samples for the horizontal line is output enabled by a respective one of the six register load signals LA-LF to generate twelve binary bits fed to a respective one of the two digital-to-analog converters 53a, 53b. The four most significant bits, however, are first descrambled by a respective one of two sets of four exclusive-OR gates 177a, 177b, in response to the random number bits $RND_{3-0}$. The respective digital-to-analog converter 53a, 53b receives the 12 bits and generates an analog signal fed to either the channel one or the channel two audio output, when the respective digital-to-analog converter is activated by a respective clock signal. The clock signals are provided by NOR gates 175a, and 175b activated by the respective combinations of load signals LA, LC, LE, or LB, LD, LF. The register transmit signals TA-TR and the register load signals LA-LF, are provided by the programmable logic array 181 in response to the horizontal count.

Figure 17:
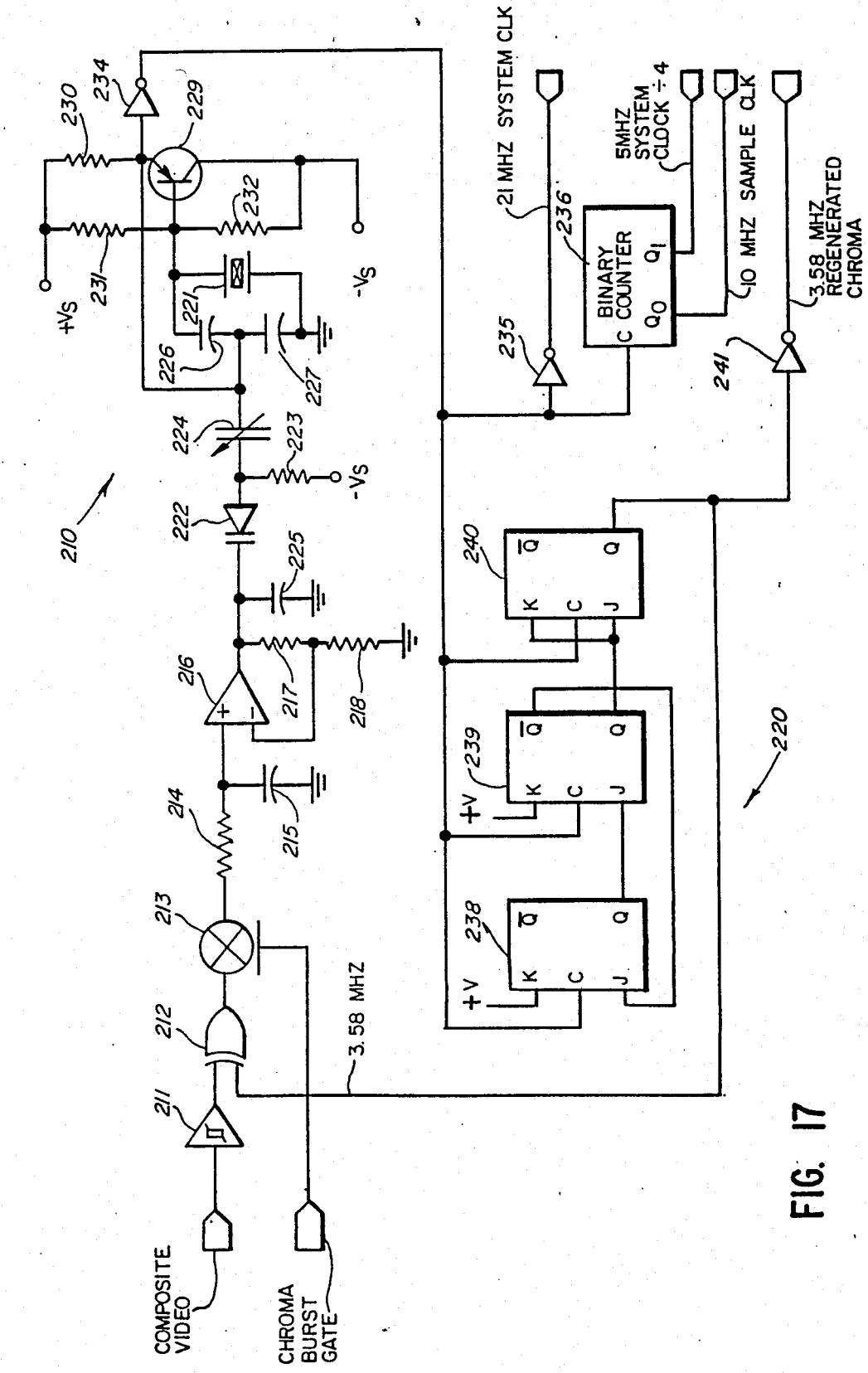
FIG. 17 is a schematic diagram of a chroma burst phase-locked loop.

A schematic diagram for the chroma-burst phase-locked loop and system clock is shown in FIG. 17. A Schmitt trigger 211 is biased between the maxima and minima of the chroma burst in the composite video, thereby generating a 50 percent duty cycle binary representation of the chroma burst. An exclusive-OR gate 212 compares the phase of the composite video to the phase of the 3.58 MHz output of a voltage controlled oscillator 210. An analog transmission gate 213 enabled by the chroma burst gate selects the phase error due to the chrome burst in the composite video. A demodulator low pass filter comprising a resistor 214 and a capacitor 215 suppresses the seven MHz product signal, thereby detecting the phase error between the chroma burst and the 3.58 MHz output of the voltage control oscillator. A value of 22K ohms for the resistor 213 and a value of 1000 picofarads for the capacitor 214 are representative.

A noninverting operational amplifier 216 acts as a buffer and is also biased for a gain of approximately 20. A feedback resistor 217 of value 100K ohms and a resistor 218, of value 5.1K ohms, provides the required negative feedback. The output of the amplifier 216 is then fed to the voltage controlled oscillator 220 to complete the chroma burst phase-locked loop.

The voltage controlled oscillator 210 is crystal controlled at the system clock frequency of six times the chroma burst frequency. A divide by six counter 220 provides the 3.58 MHz VCO output fed to the phase comparator 212. The crystal 221 has its resonant frequency pulled by a varactor 222 reverse biased by a resistor 223 typically of value 100K ohms. The varactor 222 is loosely coupled to the crystal 224 through a capacitor 224 typically of value 50 picofarads. The cathode of the varactor 222 is shunted to signal ground at the 21 MHz frequency by a capacitor 225, typically of value 1000 picofarads. The gain for the crystal oscillator is provided by a transistor 229 having an emitter load resistor 230 and biasing resistors 231 and 232. Typical component values are 2.2K ohms for resistor 230, 22K ohms for resistor 231, and 11K ohms for resistor 232. A capacitor 226 typically 100 picofarads and a capacitor 227 typically 10 picofarads provides the positive feedback from the emitter to the base of the transistor 229. The 21MHz signal is tapped off the emitter and fed to a buffer 234. A second buffer 235 provides the 21MHz system clock to the encoder or decoder. A two stage binary counter 236 provides the 10 MHz sample clock and the five MHz clock, which are obtained by dividing the system clock by two and four, respectively.

The divide by six counter 220 is comprised of three J-K flip-flops 238, 239 and 240 clocked by the 21 MHz clock. The K inputs of flip-flops 238 and 239 are tied to logic high. The J input of flip-flop 238 receives the inverted Q output of flip-flop 239, and the J input of flip-flop 239 receives the Q output of flip-flop 238 so that a division by three occurs. The third J-K flip-flop has its J and K inputs both tied to the Q output of flip-flop 239 to provide an additional division by two. By dividing the 21 MHz frequency of the crystal 224 by six, the 3.58 MHz VCO output for the phase detector 212 is obtained. Since an exclusive-OR phase detector 212 is used, the divide by six counter 220 has been designed to give a symmetrical or 50% duty cycle output. A buffer 241 provides a 3.58 MHz output for regenerating the chroma burst for the composite video transmitted from the encoder to the decoder, or for the NTSC video transmitted from the decoder to the customer's television set.

According to another feature of the present invention, a horizontal sync detector 82 (FIG. 8) is provided which can accommodate various line lengths and can tolerate missing horizontal sync pulses. If, for example, the horizontal sync detector 82 were merely a counter which rolled over upon a predetermined count, a variable line length could not be accommodated so long as the line length exceeded the roll over count of the counter. Moreover, in response to missing horizontal sync pulses, the counter would always roll over on a fixed count which would be different than the count required to accommodate a variable line length. In other words, the horizontal counter 83 should be periodically reset even though horizontal sync pulses are missing, and the frequency of the horizontal counter reset must be variable, in response to the frequency of the horizontal sync pulses when the horizontal sync pulses were received.

Shown in FIG. 18 is a circuit schematic for the horizontal sync detector 82 which performs the above described functions. In simplified terms, the horizontal sync detector 82 determines whether the period between the horizontal preset pulses is within a predetermined time window, and if so, the period is memorized so that the horizontal preset pulses may be regenerated in the case of missing horizontal preset pulses. Shown in FIG. 19 are the wave forms for the horizontal preset pulses 71b and a window gate signal 250 which sets upper and lower bounds on the permissible horizontal period. Preferably the horizontal preset pulses have a width of one system clock cycle, or approximately 50 nanoseconds. Increased precision is obtained by running the horizontal sync detector 82 at the 20 MHz clock frequency instead of the 10 MHz sample clock frequency.

The window gate 250 is generated by the combination of a synchronous up counter 251 and a window PLA 252 which generates the window gate 250 when the output of the up counter is within a predefined numerical range. The up counter 251 is comprised of three eight bit synchronous counters, part No. F196. The horizontal preset signal 71b presets the up counter 251 to an initial state of value 104. The counter continues counting until the output $Q_{11}$ goes high, thereby inhibiting further counting via the low-order clock enable signal CEP0. Configured in this way, the up counter 251 is a resettable one-shot. The window PLA 252 generates the window gate signal 250 whenever the output of the up counter 251 is within the range of 1440–1480. An AND gate 253 combines the horizontal preset with the window gate to generate a qualified preset. The qualified preset is less sensitive to noise since it occurs only when just two horizontal preset pulses have been received that are separated by the horizontal frequency to within the window gate on time. The qualified preset is then used in the decoder in lieu of the horizontal preset signal. The qualified preset signal could also be used to gate the preset input to the counter 251. In such a case the counter 251 must be permitted to freewheel so that the horizontal preset signal may be at first acquired. Use of the qualified preset to gate the preset of the counter 251 could be desirable in certain "suppressed sync" systems wherein the horizontal preset 71b is obtained by detecting a pseudorandom sequence which frequently appears in the digital data or video portion of the horizontal line. The desirability of feeding back the qualified preset to gate the preset enable of the counter 251 should be established by simple experimentation. It should also be noted that the window PLA 252 conveniently generates the chroma burst gate during counts of 130 to 184 of the up counter 251. Because the chroma burst phase-locked loop 43 can reject noise, it does not matter that the chroma burst gate is occasionally erroneous due to false triggering of the up counter 251.

The qualified preset is used to preset a down counter 254 which regenerates the horizontal preset for missing qualified preset pulses. The down counter 254 is preset to a specific value depending on the remainder from the up counter 251 upon the occurrence of the qualified preset so that the period of the regenerated horizontal preset pulses is precisely the period of the horizontal preset pulses when the horizontal preset pulses were present. In other words, the counters 251, 254 count in opposite directions so that the regenerated sync pulses are phase locked to the input stream of horizontal pulses despite varying line length. Preferably a gated latch 255 is used to remember the period between the horizontal preset pulses so that the horizontal preset pulses may be regenerated by the down counter 254 even when multiple horizontal preset pulses are missing. Part No. F173 may be used for the gated latch 255. If a gated latch is used, the qualified preset signal is preferably delayed by a flip-flop 256 so that the remainder value is transferred to the down counter 254 immediately after it is determined. It should be noted that if a gated latch 255 is not used, the delay flip-flop 256 need not be used.

The down counter 254 receives the remainder value on its eight least significant parallel inputs $P_{0-7}$ and receives an offset value of 1280 on its higher order parallel inputs $P_{8-11}$ so that the up counter 251 and the down counter 254 will count through the same number of cycles between qualified horizontal preset pulses. The final count of the down counter 254 is indicated by the higher order carry-out signal TC-3 which is active when the outputs $Q_{8-11}$ are zero, or, in other words, at state 255. The carry-out TC-3 is fed back to the parallel enable input of the counter 254 by combining the carry-out TC-3 with the qualified preset in an OR-gate 257. The parallel input to the up counter 251 and the offset $P_{8-11}$ to the down counter 254 may be experimentally determined by choosing those offsets which for the case of a periodic horizontal preset signal, generate the carry-out TC-3 precisely time coincident with the qualified preset to the OR gate 257. The output of the OR gate 257 is also used as the regenerated horizontal preset fed to the horizontal and vertical counters 83, 86, respectively (FIG. 8).

For decoding the digital program and customer data, it is especially important that the time positions of the digital data be precisely determined by a horizontal preset pulse. Thus, the absence of a qualified preset must inhibit the gated latches which receive the digital customer data for each horizontal line. For digital customer and program data, the data are periodically supplied to the decoders so that the receipt of the data will merely be delayed if the data latches are inhibited even for as long as a few frames. It is also desirable to inhibit the digital-to-analog converters 53 from responding to the decoded audio data in the absence of a qualified preset.

To generate a qualified horizontal line signal for gating the customer and program data latches, a JK flip-flop 258 is set whenever a qualified preset signal occurs and is reset whenever a carry-out TC-3 of the down counter 254 occurs without a coincident qualified preset. The set or J input of the flip-flop 258 is, therefore, merely the qualified preset signal and the K, or reset, input is generated by an AND gate 259.

Even though the regenerated horizontal preset is used to reset a separate horizontal counter 83 (FIG. 8), it may be desirable to use the outputs of the down counter 254 to specify operations occurring or synchronized to the end of the horizontal line, since the output of the down counter 254 in terms of counts from the end of a line is substantially independent of line length. One such operation occurring at the end of a horizontal line is the generation of the ground reference gate. As was described in conjunction with FIG. 5 and to be shown below, the ground reference gate could be generated from the leading edge 60a of the horizontal sync tip. But for the case of "20 IEEE suppressed sync," to be described below, an end of line PLA 260 is preferably used to generate the ground reference gate. The max reference gate, as well as the ground reference gate, should be gated by the qualified horizontal line signal. Shown in FIG. 21 is an AND gate 261 provided for qualifying the ground reference gate.

Figure 20:
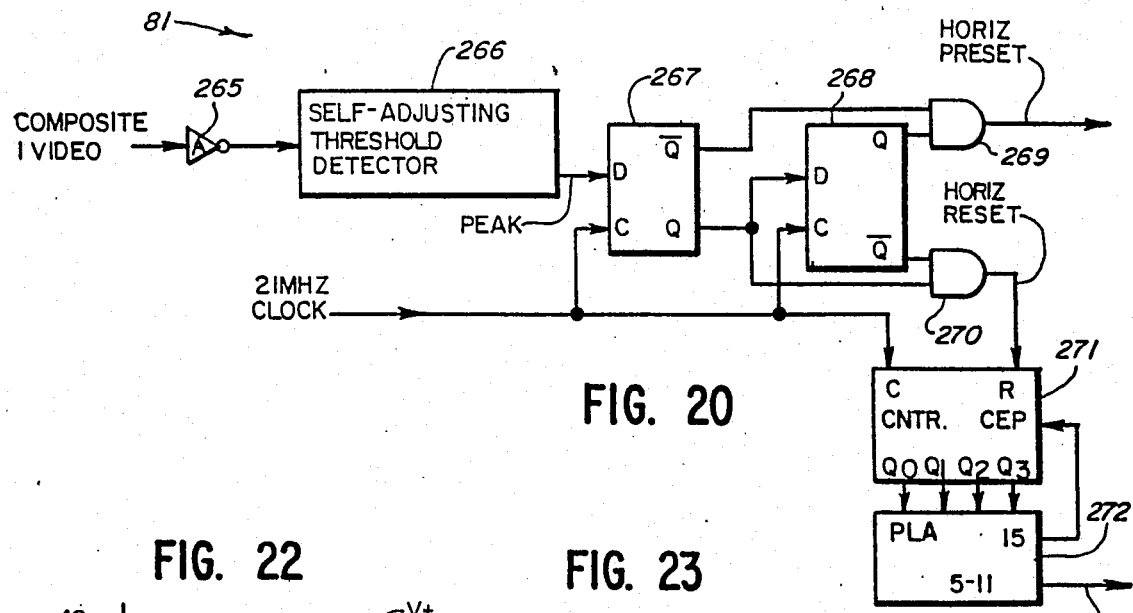
FIG. 20 is a schematic circuit diagram of a horizontal sync tip threshold detector.

Shown in FIG. 20 is a schematic circuit diagram for the horizontal sync tip window detector 81 (FIG. 8). The composite video is fed to an inverting amplifier 265 which raises the conventional one volt peak-to-peak signal level to approximately five volts peak-to-peak. The five volt signal is fed to a self-adjusting threshold detector 266 which strips off the peak of the horizontal sync tip. The peak of the horizontal sync tip is synchronized to the 21 MHz clock by a delay flip-flop 267. In order to detect the leading and trailing edges of the peak signal, the output of the delay flip-flop 267 is fed to a second delay flip-flop 268 and AND gates 269 and 270 each compare an output of the flip-flop 267 to an output of the flip-flop 268 to generate the horizontal preset and horizontal reset signals, respectively. The horizontal preset signal is generated from the AND gate 269 combining the inverted output of the flip-flop 267 and the noninverted output of the flip-flop 268. The horizontal reset is generated by the AND gate 270 combining the noninverted output of the flip-flop 267 and the inverted output of the flip-flop 268. The horizontal reset, for example, is used to reset a counter 271 which is self-inhibited upon reaching its highest state 15. The inhibit signal and also the ground reference gate are generated by a PLA 272. The ground reference gate, for example, is generated for states 5–11 of the counter 271. The counter 271 is, for example, a synchronous counter part No. F169.

Figure 22:
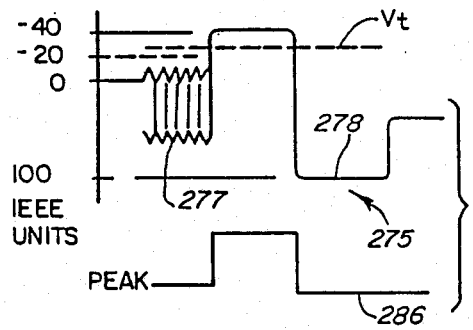
FIG. 22 is a pictorial diagram of the input and output signals for the threshold detector of FIG. 21.
Figure 21:
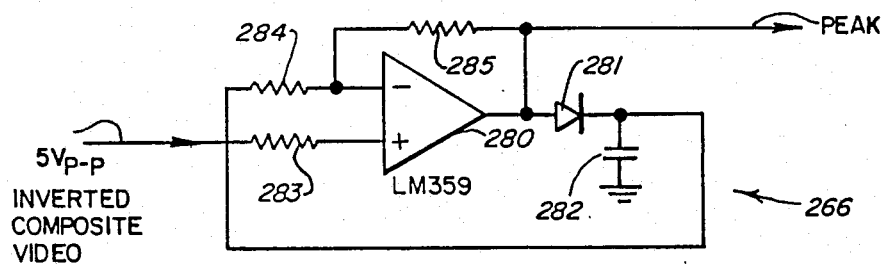
FIG. 21 is a schematic circuit diagram of a self-adjusting threshold detector having a single operational amplifier functioning as a peak detector and as a threshold detector.

The self-adjusting threshold detector 266 is shown in detail in FIG. 21 and is explained in conjunction with the timing diagram of FIG. 22. The self-adjusting threshold detector 266 receives the five volt peak-to-peak inverted composite video generally designated 275 in FIG. 22. The inverted composite video 275 has its maxima at the horizontal sync tip 276 which is preceded by a video signal 277 and followed by the max reference pulse 278. In terms of a standard composite video signal, the maximum peak-to-peak voltage of the signal is divided into 140 equal parts called IEEE units. The level of maximum brightness is at 100 IEEE units and the horizontal sync pulse is at minus 40 IEEE units. The horizontal sync pulse 276 is most difficult to detect when the video signal 277 is encoding a dark blue picture. At this time the video portion 277 extends from approximately 45 to minus 15 IEEE units. The optimum threshold voltage $V_t'$ for the self-adjusting threshold detector 266 is at approximately minus 27 IEEE units.

In accordance with another aspect of the present invention, the self-adjusting threshold detector 266 uses a single operational amplifier to function both as a peak detector and as a threshold detector having a threshold set in relation to the peak amplitude of the composite video signal. As is known in the art, a peak detector comprises an operational amplifier having the signal received on its positive input and having its negative input shunted to ground through a holding capacitor. The holding capacitor is charged through a directional diode from the output of the operational amplifier. The self-adjusting threshold detector 266 in FIG. 21 also has an operational amplifier 280, a directional diode 281, and a holding capacitor 282. The capacitor 282 typically is of value 0.6 microfarads. The five volt peak-to-peak inverted composite video is fed to the positive input of the operational amplifier 280 through a series resistor 283 typically of value 20K ohms. But the capacitor 282 is not directly connected to the negative input of the operational amplifier 280; rather, it is series connected through a resistor 284 typically of value 20K ohms. Moreover, the output of the operational amplifier 280 is fed back to the negative input through a resistor 285, typically of value 200K ohms. With these specified values of resistance and capacitance, the circuit in FIG. 21 also generates a PEAK signal 286 shown in FIG. 22 which is the signal that would be generated by a threshold detector having its threshold $V_t$ set at the desired level. The circuit of FIG. 21 also works well using a current mirror amplifier such as part No. LM359.

Figure 23:
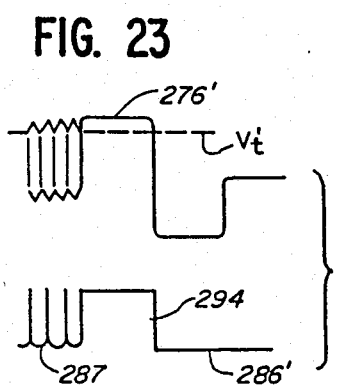
FIG. 23 is a pictorial diagram of the operation of the threshold detector of FIG. 21 when processing a video signal having a "20 IEEE" suppressed horizontal sync.

The standard composite video signal as shown in FIG. 22 is quite wasteful in transmitted power or modulation index since signal levels from about minus 15 IEEE units to minus 40 IEEE units do not carry any video information but are merely used to facilitate the detection of the horizontal sync pulse 276. In accordance with another feature of the present invention, a "20 IEEE" suppressed horizontal sync pulse 276' is used having a maximum value reduced to at least minus 20 IEEE units as shown in FIG. 23. Using the detector circuit in FIG. 21, the peak signal 286' will have a series of pulses 287 at the 3.58 MHz frequency of the suppressed chroma carrier for the worst case of a pure dark blue color picture. In other words, the extent of modulation in the minus IEEE units direction may be established by the worst case video modulation rather than the necessity for the sync pulse to be at a more negative IEEE level. Preferably, the horizontal sync pulse amplitude is limited to the maximum permitted swing of the video modulation. A discriminator circuit shown in FIG. 24 can effectively eliminate the periodic pulses 287 so that the suppressed horizontal sync tip 276' may be detected. The peak output of the threshold detector 266 is fed to the D input of a four stage shift register 291. The shift register 291 is clocked at the 21 MHz clock rate. A peak signal without the pulses 287 may be obtained by the logical AND of at least two outputs of the shift register 291. The exemplary horizontal preset detector circuit 290 in FIG. 24 logically combines all four outputs of the four stage shift register 291 using an AND gate 292. A horizontal preset output is conveniently obtained from a D flip-flop 293 which receives the output of the AND gate 292 on its D input and is clocked at the 21 MHz rate. The required negative transition (294 in FIG. 23) is selected by an inverter 295 which receives the PEAK signal and has its output fed to the AND gate 292 for combination with the outputs $Q_{0-3}$ of the shift register 291.

One of the advantages of the present invention is that the conventional audio carrier of the television channel has been eliminated, thereby eliminating adjacent sound channel interference. This is one factor which helps ensure that the discontinuities introduced by the video scrambling method will not be visible in the descrambled picture.

In accordance with another feature of the present invention, the digital customer and program data is encoded using a correlative signalling technique so that the digital data is more efficiently transmitted within the television channel. Up to now it has been assumed that two binary bits are transmitted for every two video samples at a 10.7 MHz video sample rate. In view of the Nyquist criteria, it should be possible to transmit digital samples at the 5.4 MHz digital sample rate since the television channel has a maximum band width of 4.3 MHz. In practice, however, the intersymbol interference between the digital samples is objectionable. Although the transmission of four-bit digital samples at a 2.7 MHz rate will eliminate the intersymbol interference, it is not the most efficient and practical method for transmitting the digital data. It is preferable to live with the objectionable intersymbol interference at the 5.4 digital sample rate. A promising alternative is to use a correlative signalling technique wherein intersymbol interference is deliberately introduced so that, in effect, the spectra of the digital signal more closely matches the frequency response of the transmission channel. Correlative signalling techniques are discussed at length by Dr. Adam Lender in "Correlative (Partial Response) Techniques And Applications To Digital Radio Systems," reprinted in, Feher, *Digital Communications Microwave Applications*, Prentice-Hall Inc., Inglewood Cliffs, N.J., 1981, pp. 144-182.

Figure 25:
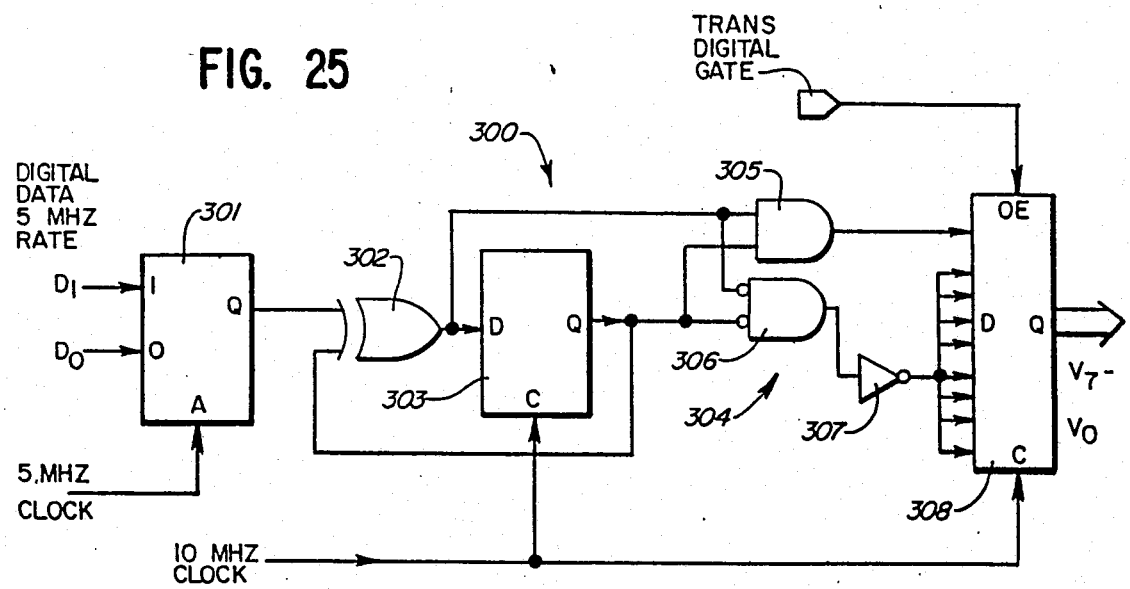
FIG. 25 is a schematic circuit diagram of a correlative encoder for efficiently transmitting the digital customer and program data within the bandwidth of the television channel.

For the present video transmission system, the data are efficiently transmitted at a 10.7 megabit per second rate using a duobinary correlative encoding method discussed in Example 7.1 on page 153 of the Feher text. A practical circuit is shown in FIG. 25. Assuming that the previously described digital data formatting circuits provide two bits $D_1-D_0$ at the 5 MHz clock rate, the correlative encoder 300 needs a multiplexer 301 for alternately selecting either the most significant bit $D_1$, or the least significant bit $D_0$ at the five MHz clock rate to generate a single bit data stream at approximately 10 MHz. These single bits at 10 MHz define two levels. In accordance with the correlative signalling method, these two levels are differentially encoded using a modulo two adder and then the differential data is linearly superimposed or convolved over two 10 MHz sample intervals. An exclusive-OR gate 302 performs the single-bit modulo two addition. The modulo two sum is delayed in a delay flip-flop 303 clocked at the 10 MHz sample clock rate. The delayed modulo two sum is fed back as one input to the adder 302 and added to the output of the multiplexer 301.

The modulo two sum from the adder 302 and the register 303 are summed together in a second adder generally designated 304 thereby generating the correlative encoded data which defines three levels. The three levels are specified by hexadecimal values of FF, 3F and OO on the eight-bit video output $V_7-V_0$. The most significant bit $V_7$ is a logical one only when both the input D and the output Q of the delay flip-flop 303 are high. Thus the most significant bit $V_7$ is provided by an AND gate 305. The less significant bits $V_6-V_0$ are all logical zero only when both the input D and the output Q of the delay flip-flop 303 are low. Thus, the less significant bits are provided by a NOR gate 306 and an inventer 307.

It should be noted that the correlative encoded values can be thought of as the superposition of two data streams that change at a five MHz rate but which are offset from each other. Each of these data streams, however, can pass through the video transmission channel as well as the unencoded data consisting of four bits at a five MHz rate. But the transmitted correlative encoded data is quantized to three levels instead of the four levels required to quantize the unencoded data. Thus, it is expected that the data should be more reliably detected at the decoder because the three levels are spaced further apart than the four levels required for transmitting the unencoded data. Theoretically, the increase in transmission efficiency is obtained due to the fact that the spectra of the correlative encoded data is a better match to the frequency response of the television channel. Unlike the spectra of the unencoded data which is relatively flat up to approximately 2.5 MHz and drops off rapidly above 2.5 MHz, the spectra of the correlative coded data gradually drops off between 2.5 MHz and 5 MHz. In both cases, however, the binary data is transmitted at the same density of about one bit every 100 nanoseconds.

In the encoder 300 of FIG. 25, the output of the second adder 304 is latched in a register 308 having tristate outputs which are wired-OR'ed to input bus of the the video digital-to-analog converter 33 in FIG. 1. The outputs of the register 308 are enabled by a transmit digital gate when the digital signal should appear in the encoded composite video.

Figure 26:
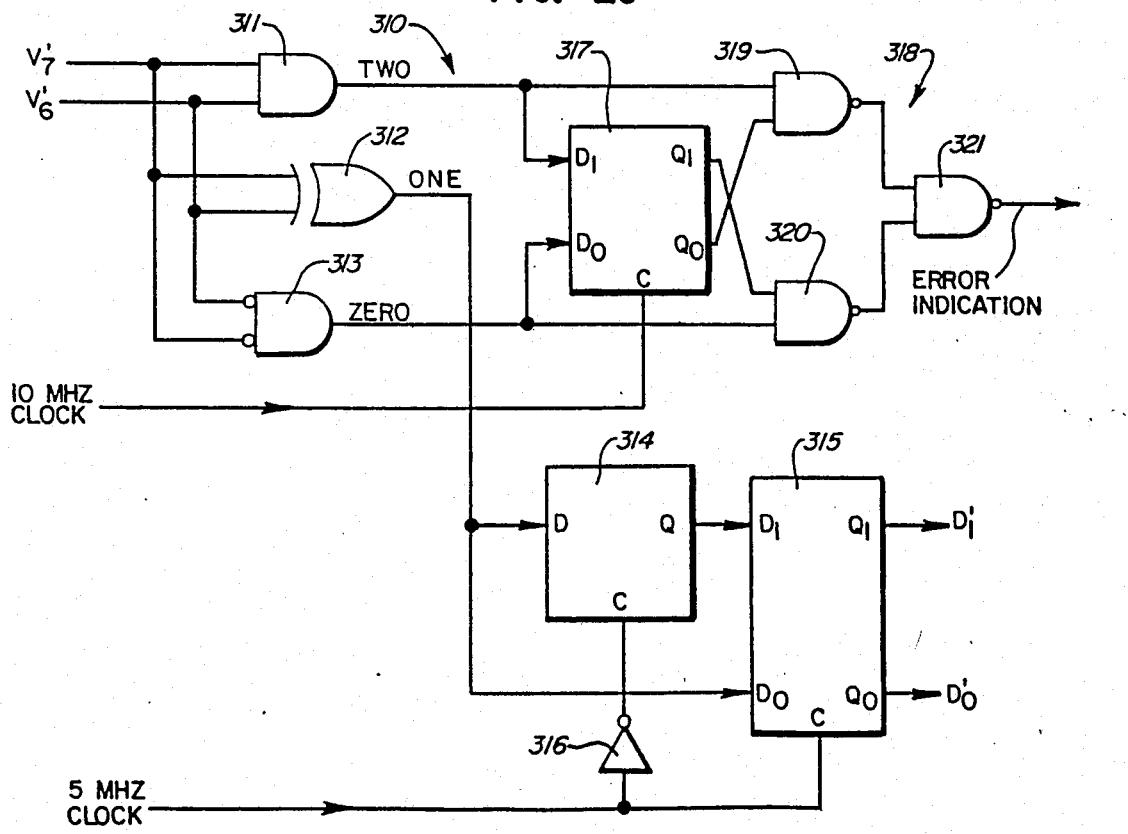
FIG. 26 is a schematic circuit diagram of the decoder for the encoder of FIG. 25, including error detection circuitry.

A corresponding correlative decoder 310 is shown in FIG. 26. Since the number of unencoded levels is two, the decoded levels are obtained by taking mod two of the encoded levels ranging from level zero to level two. Thus, the occurrence of level one gives the decoded bits directly. The three encoded levels are obtained as the logical AND 311, exclusive-OR 312, or logical NOR 313 of the two most significant bits $V_7-V_6$ on the digital video bus which were generated by the decoder's analog-to-digital converter 45 in FIG. 2. The decoded bits at the 10 MHz rate are alternately latched into registers 314, 315 at the 5 MHz digital sample clock rate.

Another advantage of using correlative coding is that errors may be detected by determining whether the value of the received encoded bits $V_7$, $V_6$ change in value by more than a value of one from one 10 MHz sample clock cycle to the next. From the circuitry of the encoder 300 in FIG. 26, it is apparent that the encoded duobinary cannot change between levels zero and two from one 10 MHz sample clock cycle to the next. The maximum change occurs, for example, when the register 303 holds a value of one and a new value of zero is strobed in, or when the register 303 holds a value of zero and a new value of one is strobed in. To determine whether a change between levels zero and two has occurred, register 317 receives the three signals indicating levels zero and two. A logic network 318 comprising three NAND gates 319, 320, 321 determine whether a direct change between levels zero and two has occurred and if so, an error indication is generated at the output of gate 320. This error indication could be used, for example, to suspend the latching of new customer and program data, to squelch the audio descrambler by inhibiting the loading of the D/A converters 53 to hold the present 12-bit audio samples or it could be used as a diagnostic tool monitoring the performance of the video transmission channel.

The decoder 40 shown in FIGS. 2 and 8, has been described as having a horizontal sync detector 82 operating at a frequency of 21 MHz but having a horizontal counter 83 and other system timing circuits 44 operating at 10.7 MHz. It is evident that if the horizontal counter 83 were merely reset upon the occurrence of the horizontal reset pulse generated by the sync detector 82 operating at 21 MHz, there would be a loss of precision since the horizontal sync pulse could occur during either the first half or the second half of a 10.7 MHz sample clock cycle, but the horizontal counter 83 would respond in the same fashion to either the "early" or "late" horizontal sync pulse. But by using a "re-phase" circuit shown and described in FIGS. 27 and 28, it is possible to synchronize the horizontal counter 83 to a sync pulse to obtain a timing resolution exceeding the period of the clocking frequency of the counter. Instead of using a faster clock to obtain increased synchronization precision, the clock signal to the counter is selectively stretched by one-half cycle so that the counter may, in effect, count on either the leading or trailing edge of the unaltered clock. The timing resolution is increased from one period to ½ of the period of the clock. The clock is selectively stretched ½ period upon receipt of the sync pulse depending on whether the sync pulse is received during the first half or the last half of the clock period.

Figure 24:
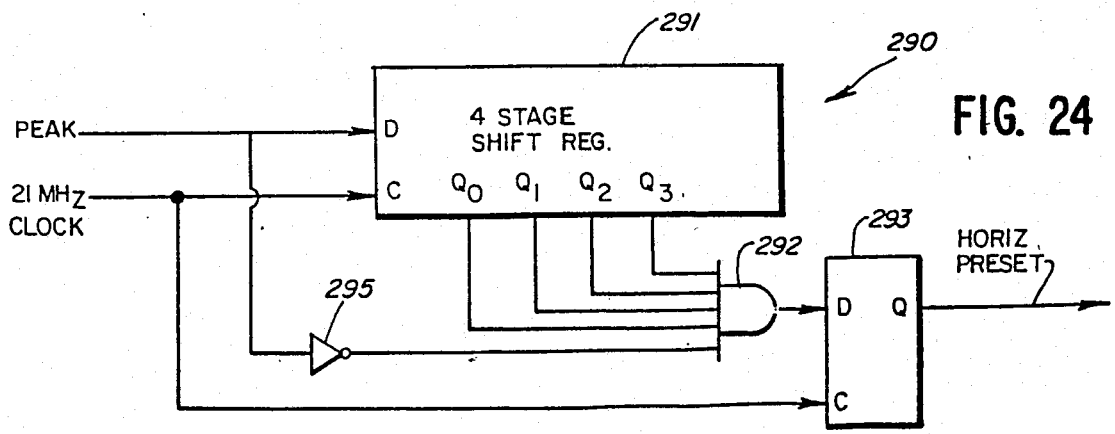
FIG. 24 is a schematic circuit diagram of a circuit for detecting "20 IEEE" suppressed horizontal sync.
Figure 27:
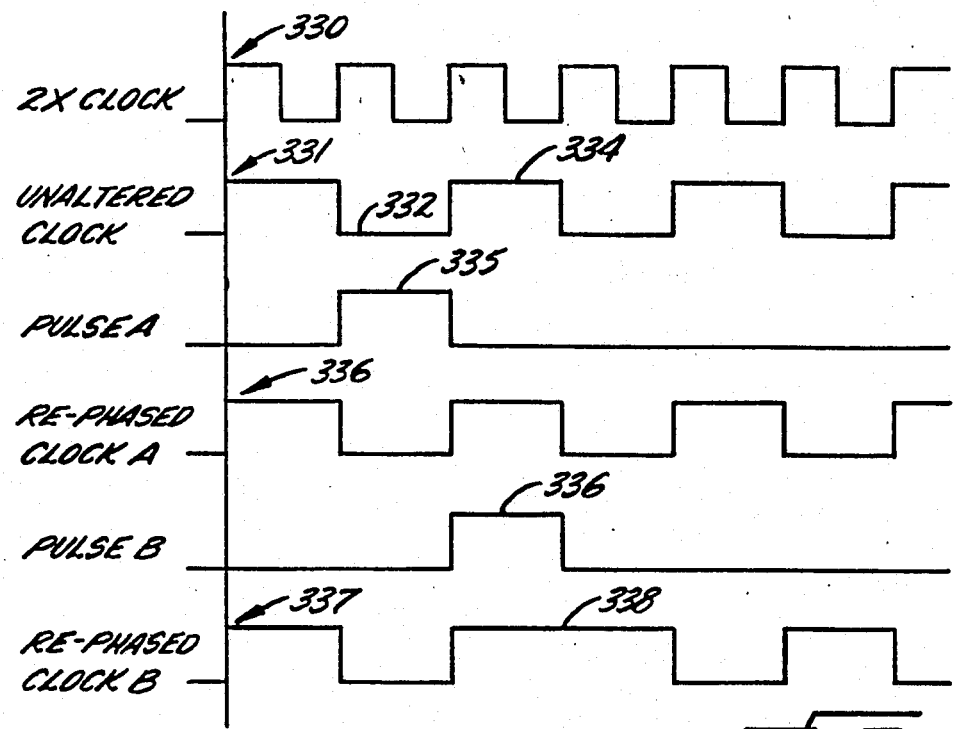
FIG. 27 is a timing diagram for a clock rephase circuit for permitting the horizontal counters to have increased timing resolution.

Turning now to FIG. 27, a 2×CLOCK signal 330 is shown corresponding to the 21 MHz clock used, for example, in the synchronization circuit of FIGS. 18, 20, or 24. The unaltered clock 331 corresponds to the 10.7 MHz sample clock shown clocking the horizontal counter 83 in FIG. 8. A sync pulse synchronized to the 2×CLOCK 330 could either occur during an initial half period 332 or a final half period 334 of the unaltered clock 331. Pulse A 335, for example, occurs during the initial half cycle 332 of the unaltered clock 331. In response to pulse A, the re-phased clock A 336 is the same as the unaltered clock 331. But in response to a pulse B 336 occurring during the second half period 334 of the unaltered clock 331, the rephased clock B 337 has a portion 338 which is stretched by ½ period of the unaltered clock so that the re-phased clock is phase shifted 180° with respect to the unaltered clock 331. Assuming that the horizontal counter 83 (FIG. 8) is clocked on the rising edge of the re-phased clock, it is evident that depending on whether pulse A 335 or pulse B 336 is used to reset the horizontal counter, the actual counting will be selectively delayed by ½ of the unaltered clock. Hence, the horizontal resolution of the horizontal counter 83 in response to a sync pulse, is doubled without requiring the clocking frequency to be doubled.

Figure 28:
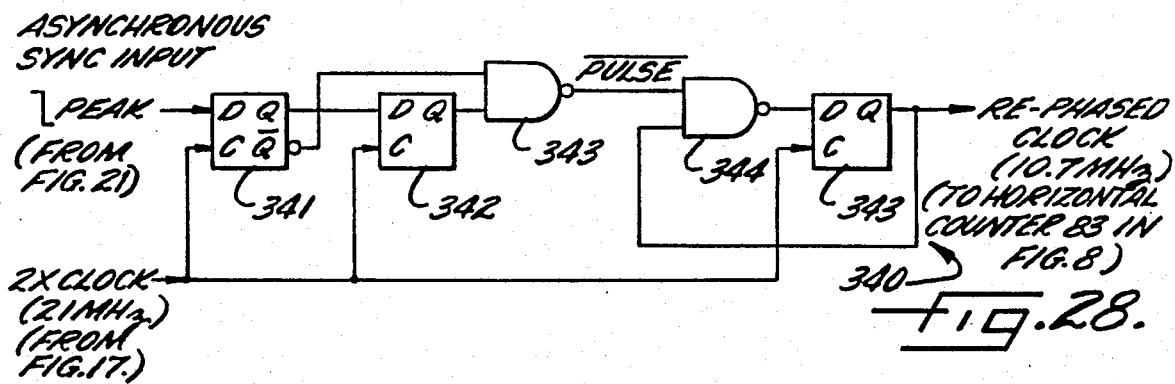
FIG. 28 is a schematic diagram of a clock rephase circuit generating the signals shown in FIG. 27.

A representative re-phase circuit 340 is shown in FIG. 28. The re-phase circuit 340 receives an asynchronous peak signal having a high-to-low transition to which a horizontal counter is to be synchronized. This peak signal is received on the D input of a delay flip-flop 341 clocked by the 2×CLOCK, for example at 21 MHz. Its Q output is delayed by a second delay flip-flop 342 also clocked by the 2×CLOCK signal. A NAND gate 343 is active low upon receiving a high Q output from a second flip-flop 342 and a high $\overline{Q}$ output of the first delay flip-flop 241 to thereby sense the high-to-low transition in the PEAK signal. The output of the NAND gate 343 provides the PULSE signal active low, which is fed to a second NAND gate 344.

The output of the NAND gate 344 is fed to the D input of a third delay flip-flop 343 also clocked by the 2×CLOCK. The Q output of the third delay flip-flop 343 is fed back to a second input of the NAND gate 344 so that the re-phased clock, at 10.7 MHz, appears at the Q output of the delay flip-flop 343.

In functional terms, in the absence of an active low PULSE signal, the NAND gate 344 functions as an inverter so that the complement of the stored value in the delay flip-flop 343 is fed back to the D input of the flip-flop. Thus, the flip-flop 343 functions as a single stage binary divider, to generate a 10.7 MHz clock from the 21 MHz clock. But if the PULSE signal becomes active low, then the NAND gate 344 is inhibited and presents a logic high signal to the delay flip-flop 343 so that the re-phased clock will assume a logic high state for the next cycle of the 2×CLOCK signal regardless of its initial state. Note that this is a sufficient condition to guarantee that the re-phased clock 336 or 337 will be generated in response to the PULSE signals 335 or 336, since the desired re-phased clock 336 or 337 always assumes a logic high after the occurrence of either PULSE A 335 or PULSE B 336.

Figure 29:
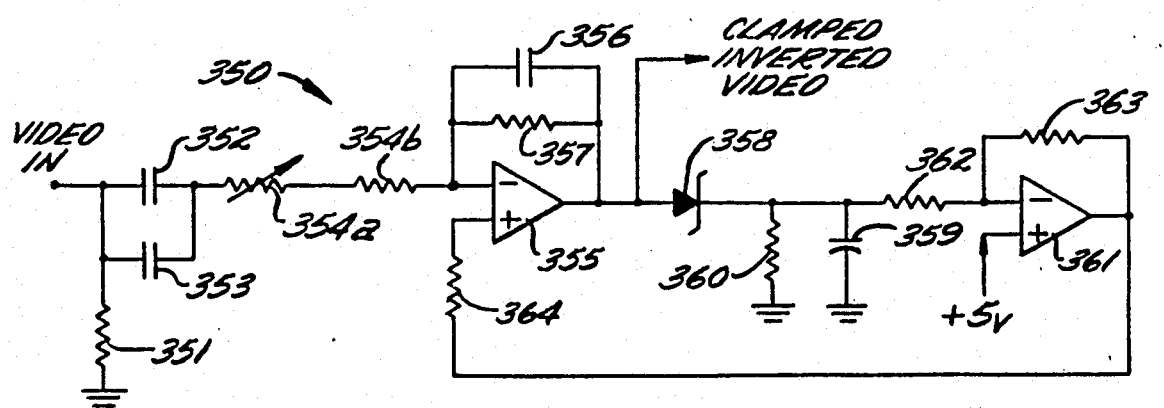
FIG. 29 is a schematic diagram of a fast acting clamp circuit for establishing a ground reference level for the received video signal.

As shown in FIG. 8, the ground reference for the eight-bit analog-to-digital converter 45 is obtained by shunting the received encoding composite video to ground upon the occurrence of a ground reference gate. It has been found that such a technique requires rather wide horizontal sync tips in order for the ground reference to be properly established. A circuit shown in FIG. 29 is preferably used to permit a ground reference to be established by narrow horizontal sync tips such as are shown in FIG. 5. This clamp circuit generally designated by 350 in FIG. 29 receives the video input on a load resistor 351 of approximately 82 ohms. The video input is coupled by a 100 microfarad capacitor 352 and a 0.1 microfarad capacitor 353. A 500 ohm variable resistor 35a in series with the capacitors 352, 353 provides a gain adjustment. The video signal is then fed through a 750 ohm resistor 354b to the negative input of a differential amplifier 355. The differential amplifier 355 has a 2.2 picofarad capacitor 356 and a 7.5K ohm resistor 357 providing negative feedback. The positive input of the differential amplifier 355 receives the minimum value of the video signal so that in effect the clamped inverted video appearing at the output of the differential amplifier 355 is obtained as the difference between the video input and the minimum value of the video input. The clamp circuit, in other words, does not shunt the video input to signal ground, rather, the clamp circuit generates a reference for the differential amplifier 355 so that the clamped inverted video has its maximum value set to a predetermined reference level. The maximum value of the clamped inverted video is obtained by a Schotky diode 358 charging a storage capacitor 359 of value 0.1 microfarad. A discharge path for the capacitor 359 is provided by a resistor 360 of value 1 megohm. The most positive value of the clamped inverted video becomes stored on the capacitor 359, and this maximum value is buffered by an operational amplifier 361 using a 100K ohm series input resistor 362 and a 22 megohm negative feedback resistor 363. The positive input of the operational amplifier 361 receives a reference voltage of +5 volts on its positive input so that the maximum of the inverted video is clamped to +5 volts. The output of the operational amplifier 361 is fed through a 9.1K ohm resistor 364 back to the positive input of the differential amplifier 355. Note then that there is a negative feedback loop from the differential amplifier 355 through the diode 358 and through the operational amplifier 361. Although the clamp circuit 350 in FIG. 29 uses a diode 358 so as to clamp the maximum of the inverted video to +5 volts, the diode 358 may be replaced by a transmission gate such as the transmission gate 87b in FIG. 8, to clamp any particular portion of the video signal to the +5 volt reference level.

From the foregoing, it can be seen that the subscriber cable television system of the present invention has a decoder employing digital circuitry which may be embodied in low-cost large-scale integrated circuits. The system, however, has extremely high security and also an increased capacity for transmitting program and customer data to the decoder units. For ease of data handling, two channel audio, video, and high capacity program and customer data are multiplexed for transmission on the same composite video signal. The decoder unit employs a system timing circuit which precisely synchronizes the sample times on the received composite video signal to the chroma burst, regardless of whether the video information is for a color or black-and-white program. An improved time-warp and segment scrambling method was disclosed requiring reduced memory requirements and a memory architecture.

What is claimed is:

1. A video transmission system providing secure transmission of a composite video signal over a communications channel for reception by designated customers,
   the composite video signal having scrambled video information in frames having a predetermined number of lines, synchronization information indicating the starting positions of the lines and the first line in each frame, and customer data for designating individual customers permitted to receive the composite video signal and descramble the video information therein,
   the video transmission system having an encoder for digitizing a composite video signal and scrambling the resulting digital video signals, and a decoder for each customer for receiving the scrambled video signal and descrambling the video signal,
   multiple lines of the video signal in each frame including a max reference pulse located outside of the video portions of the lines for providing a full scale signal to establish a reference for analog-to-digital conversion of the composite video signal.

2. The video transmission system of claim 1 wherein multiple lines of the composite video signal in each frame include a ground reference signal located outside of the video portions of the lines to establish the range of the analog-to-digital conversion of the composite video signal.

3. A video transmission system providing secure transmission of a composite video signal over a communication channel for reception by designated customers,
   the composite video signal having scrambled video information in frames having a predetermined number of lines, synchronization information indicating the starting positions of the lines and the first line in each frame, and customer data for designating individual customers permitted to receive the composite video signal and descramble the video information therein,
   the video transmission system having an encoder for generating the composite video signal from station video and customer data, and a decoder for each customer for receiving the composite video signal and descrambling the video signal therein in response to the customer data in the composite video signal, and
   said composite video signal also including a chroma burst signal and at least one bit identifying the video information as black-and-white when the video information is only black and white, means in the encoder for generating a system clock synchronized to said chroma burst signal, and means in the decoder responsive to said chroma burst signal for generating a system clock synchronized to the system clock in the encoder, and for enabling color killer circuits in response to said bit identifying the video information as black-and-white.

* * * * *